(12) United States Patent
Conroy

(10) Patent No.: US 10,740,700 B2
(45) Date of Patent: *Aug. 11, 2020

(54) INCIDENT RESOURCE MANAGEMENT

(71) Applicant: Joseph E. Conroy, Acton, MA (US)

(72) Inventor: Joseph E. Conroy, Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,535

(22) Filed: Oct. 11, 2018

(65) Prior Publication Data

US 2019/0050760 A1    Feb. 14, 2019

Related U.S. Application Data

(63) Continuation of application No. 13/454,581, filed on Apr. 24, 2012, now Pat. No. 10,108,912.

(60) Provisional application No. 61/478,902, filed on Apr. 25, 2011.

(51) Int. Cl.

| | | |
|---|---|---|
| *G06Q 10/06* | (2012.01) |
| *G06Q 10/02* | (2012.01) |
| *G08B 25/00* | (2006.01) |
| *G08B 27/00* | (2006.01) |
| *G08B 25/01* | (2006.01) |
| *G06Q 10/10* | (2012.01) |

(52) U.S. Cl.
CPC ..... *G06Q 10/025* (2013.01); *G06Q 10/06311* (2013.01); *G06Q 10/06312* (2013.01); *G08B 25/003* (2013.01); *G08B 25/004* (2013.01); *G08B 25/006* (2013.01); *G08B 25/016* (2013.01); *G08B 27/001* (2013.01); *G06Q 10/06* (2013.01); *G06Q 10/063112* (2013.01); *G06Q 10/063116* (2013.01); *G06Q 10/1097* (2013.01)

(58) Field of Classification Search
CPC ....... G06Q 10/06312; G06Q 10/06375; G06Q 10/0639; G06Q 10/063114; G06Q 50/26; G06Q 10/025; G06Q 10/06; G06Q 10/06311; G06Q 10/063112; G06Q 10/063116; G06Q 10/1097; G08B 25/003; G08B 25/004; G08B 25/006; G08B 25/016; G08B 27/001

See application file for complete search history.

(56) References Cited

U.S. PATENT DOCUMENTS

| | | | | |
|---|---|---|---|---|
| 7,395,151 B2 * | 7/2008 | O'Neill | ............ | G01C 21/3407 701/411 |
| 7,937,068 B2 * | 5/2011 | Hogberg | ............ | H04L 41/5006 455/404.2 |

(Continued)

*Primary Examiner* — Gregory J Toatley, Jr.
*Assistant Examiner* — Lynda Dinh
(74) *Attorney, Agent, or Firm* — Jonathan B. David

(57) ABSTRACT

In an embodiment, a system may comprise a communications network and processing logic. The processing logic may acquire information regarding an incident, identify a first mobile resource (MR) that may respond to the incident based on a type of the incident and a capability associated with the first MR. The processing logic may further identify a generic path scenario to the incident based on a location of the MR and a location of the incident. The processing logic may identify that the first MR is preferred over a second MR with respect to responding to the incident and assign the first MR to the incident. The processing logic may send a message via the communications network to the first MR to notify the first MR that it has been assigned to the incident.

21 Claims, 14 Drawing Sheets

(56) References Cited

U.S. PATENT DOCUMENTS

2009/0284348 A1* 11/2009 Pfeffer .............. G08B 25/006
340/7.3
2010/0158202 A1* 6/2010 Johnson ............ G08B 25/003
379/45

* cited by examiner

INCIDENT RESOURCE MANAGEMENT

RELATED APPLICATIONS

This application is a continuation of earlier filed U.S. patent application Ser. No. 13/454,581 entitled "INCIDENT RESOURCE MANAGEMENT,", filed on Apr. 24, 2012 (now allowed), which claims the benefit of U.S. Provisional Patent Application No. 61/478,902, titled "Incident Resource Management Systems", which was filed on Apr. 25, 2011 and which the contents thereof are incorporated by reference in their entirety as though fully set forth herein.

BACKGROUND OF THE INVENTION

The invention generally relates to systems and methods, and more specifically to incident resource management.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for incident resource management.

In general, in one aspect, the invention features a system including a communications network, and processing logic for acquiring information regarding an incident, the information including a type of the incident and a location of the incident, identifying a first mobile resource (MR) based on the type of the incident and a capability associated with the first MR, identifying a second MR based on the type of the incident and a capability associated with the second MR, identifying a first generic path scenario to the incident based on a location of the first MR and the location of the incident, identifying a second generic path scenario to the incident based on a location of the second MR and the location of the incident, identifying the first MR as preferred over the second MR with respect to responding to the incident, the first MR being deemed preferred over the second MR based on the first generic path scenario and the second generic path scenario, and sending a message via the communications network to the first MR, the message indicating that the first MR is assigned to the incident.

In another aspect, the invention features a method including acquiring information regarding an incident, the information including a type of the incident and a location of the incident, identifying a first mobile resource (MR) based on the type of the incident and a capability associated with the first MR, identifying a second MR based on the type of the incident and a capability associated with the second MR, identifying a first generic path scenario to the incident based on a location of the first MR and the location of the incident, identifying a second generic path scenario to the incident based on a location of the second MR and the location of the incident, identifying the first MR as preferred over the second MR with respect to responding to the incident, the first MR being deemed preferred over the second MR based on the first generic path scenario and the second generic path scenario, and sending a message via a communications network to the first MR, the message indicating that the first MR is assigned to the incident.

In still another aspect, the invention features a method including acquiring path information of a mobile resource (MR) via a communications network, acquiring a location of the MR, determining based on the location of the MR and the path information whether the MR has reached a trigger point; and taking action to accommodate the MR based on the MR reaching the trigger point.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

An incident may involve an occurrence of an event. The event may be of various types. For example, the event may involve an accident (e.g., a car crash, an airplane crash), a visit by a dignitary (e.g., a visit by the President of the United States), a festival (e.g., Oktoberfest), or other event (e.g., rock concert, sports event, rodeo, convention).

An incident may require various resources to handle the incident. These resources may be provided by a government (e.g., city government, state government, federal government) and/or a private entity (e.g., a privately-owned security service, privately-owned ambulance service). The resources may include, for example, people, equipment, materials, or other resources.

An incident may require specific types of resources. For example, an incident may involve an automobile crash where a person may incur various injuries. The injuries may require immediate medical attention and that the person be transported to a hospital. The incident may warrant various resources, such as, for example, an ambulance to transport the injured person to the hospital, an emergency medical technician (EMT) to provide immediate medical aid, and a police officer to take a report as well as provide assistance (e.g., traffic control) at the location of the incident. The resources may act as a team that responds to the incident. Moreover multiple resources may respond to the incident at the same time. Thus, proper coordination of the resources may be important.

An incident may be time sensitive. For example, the incident may involve an airplane crash and injuries incurred by a person may be life-threatening. Response time of responders to the incident may be time-critical.

An incident may be associated with a location. For example, an incident may involve a fire and the location of the incident may be a location of the fire.

Time sensitivity, resource requirements, location, and/or type are examples of characteristics of an incident that may be included in information about the incident. Other characteristics, such as, for example, time-of-day and severity-level, severity of injuries, and/or extent of destruction to property may also be included in information about the incident. This information may be used by an incident resource management system (IRMS) to identify, dispatch, and/or control resources to handle the incident.

Figure 1:
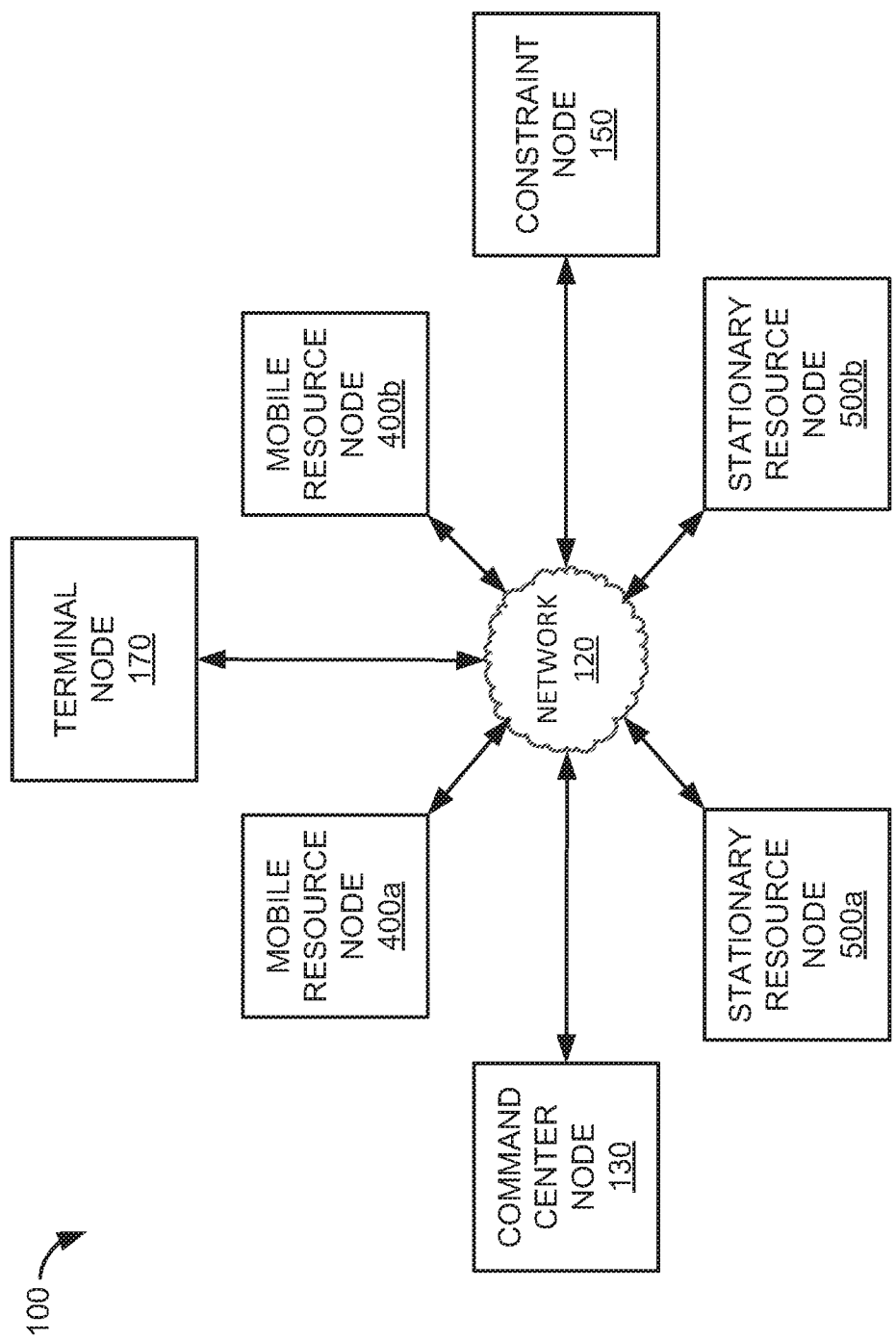
FIG. 1 illustrates a block diagram of an example of an incident resource management system (IRMS)

FIG. 1 illustrates a block diagram of an example of an IRMS 100. Referring to FIG. 1, IRMS 100 may contain various entities including various nodes coupled to a network 120. The nodes may include, for example, a command center node (CCN) 130, mobile resource nodes (MRNs) 400*a-b*, terminal node (TN) 170, constraint node (CN) 150, and stationary resource nodes (SRNs) 500*a-b*. It should be noted that FIG. 1 illustrates an example of an incident resource management system. An incident resource management system may contain more or fewer entities than the entities shown in FIG. 1. Further, functions associated with the various entities may be distributed among the entities differently than described herein.

A node in IRMS 100 may be associated with an identifier (e.g., an Internet Protocol (IP) address). The identifier may be used to identify the node in communications that are sent and/or received by the node. For example, CCN 130 may be associated with a first IP address and MRN 400*a* may be associated with a second IP address. CCN 130 may send a message to MRN 400*a* by specifying the second IP address as a destination address for the message. The message may also include the first IP address as a source address so that a source for the message may be identified, for example, by MRN 400*a*.

CCN 130 may be associated with a command center. CCN 130 may include provisions for, inter alia, acquiring information about an incident, identifying one or more resources for the incident, and managing the identified resources. Managing may include, for example, assigning and/or dispatching the identified resources to the incident. CCN 130 may include a computing device. An example of a computing device that may be included in CCN 130 will be described further below.

MRNs 400*a-b* may be associated with one or more mobile resources (MRs). An MRN 400 may include logic that may be used to communicate with other nodes in IRMS 100. An example of an MRN will be described further below.

An MR may be assigned and/or dispatched to an incident by, for example, a command center. The MR may be assigned and/or dispatched to the incident based on, for example, information about the incident. For example, an incident may involve a house fire and the command center may identify a fire engine as an MR that may handle the incident (e.g., extinguish the fire). The command center may assign and dispatch the fire engine to the incident. Other MRs that may be assigned and dispatched to incidents may include, for example, police cars, taxis, tow trucks, ambulances, aircraft, military equipment, persons (e.g., police officers, EMTs, military personnel, volunteers), or other mobile resources.

TN 170 may be associated with an endpoint for an incident. For example, an incident may include a car crash involving an injured person. An endpoint for the incident may be a hospital to where the injured person is to be transported. The hospital may contain a TN 170 that communicates with other nodes in system 100 via network 150. The TN 170 may be used to, for example, track an MR along a path taken by the MR from the incident to the hospital. Note that a TN 170 may perform other functions for the hospital, such as provide status information about the hospital and/or resources available at the hospital to other nodes in IRMS 100.

CN 150 may include a node that provides constraint information (e.g., traffic congestion, physical road conditions). The information may be provided to various nodes in IRMS 100. For example, CCN 130 may identify a path to an incident for an MR. CN 150 may provide information used by CCN 130 to identify the path. Specifically, CN 150 may provide traffic congestion information to CCN 130. CCN 130 may use the traffic congestion information to identify the path.

Examples of CNs 150 may include cell phones, sensors, portable computing devices, tracking devices, and/or location reporting devices. Note that CN 150 may be fixed or mobile. For example, a CN 150 may be associated with a sensor that is located at a fixed location and reports traffic volume at that location. Likewise, for example, a CN 150 may be associated with an automobile. The CN 150 may include a location reporting device that reports a location of the automobile.

SRNs 500*a-b* may be associated with stationary (fixed) resources (SRs). Examples of an SR may include a traffic intersection, gate, or bridge. For example, an SR may include an intersection in a path taken by an MR to an incident may be assigned to the incident. Likewise, for example, an SR may include intersections that are not located on the path but may influence traffic patterns in the path.

An SR may be assigned to an incident. For example, if the SR is an intersection in a path taken by an MR to an incident, the SR may be assigned to the incident. Likewise, if the SR may influence traffic patterns in the path to the incident, the SR may be assigned to the incident.

An SRN 500 associated with an SR may, for example, include logic that may report a status of the SR and/or control the SR. For example, an SR may include an intersection. SRN 500*a* may be associated with the SR. The SR may include a traffic light to control the flow of traffic through the intersection. SRN 500*a* may include logic that may be used to control and/or report a status of the traffic light. An example of an SRN 500 will be described further below.

Network 120 may be a communications network that may enable messages to be exchanged between nodes in IRMS 100. The messages may contain information (e.g., data). The messages may be exchanged using various protocols, such as, for example, IP, Asynchronous Transfer Mode (ATM)

protocol, Synchronous Optical Network (SONET) protocol, the User Datagram Protocol (UDP), Transmission Control Protocol (TCP), the Institute of Electrical and Electronics Engineers (IEEE) 802.11 protocol and/or some other protocol. The messages may be contained in one or more data packets that may be formatted according to various protocols. The messages may be unicast, multicast, and/or broadcast to nodes in IRMS 100.

Network 120 may include various network devices, such as, for example, gateways, routers, switches, firewalls, servers, repeaters, address translators, and/or other network devices. Portions of the network 120 may be wired (e.g., using wired conductors, optical fibers) and/or wireless (e.g., using free-space optical (FSO), radio frequency (RF), acoustic transmission paths). Portions of network 120 may include an open public network, such as the Internet. Portions of the network 120 may include a more restricted network, such as a private intranet, virtual private network (VPN), restricted public service network, and/or some other restricted network. Portions of network 120 may include a wide-area network (WAN), metropolitan area network (MAN), and/or a local area network (LAN). Portions of network 120 may be broadband, baseband, or some combination thereof. Implementations of network 120 and/or devices operating in or on network 120 may not be limited with regards to, for example, information carried by the network 120, protocols used in the network 120, and/or the architecture/configuration of the network 120.

Figure 2:
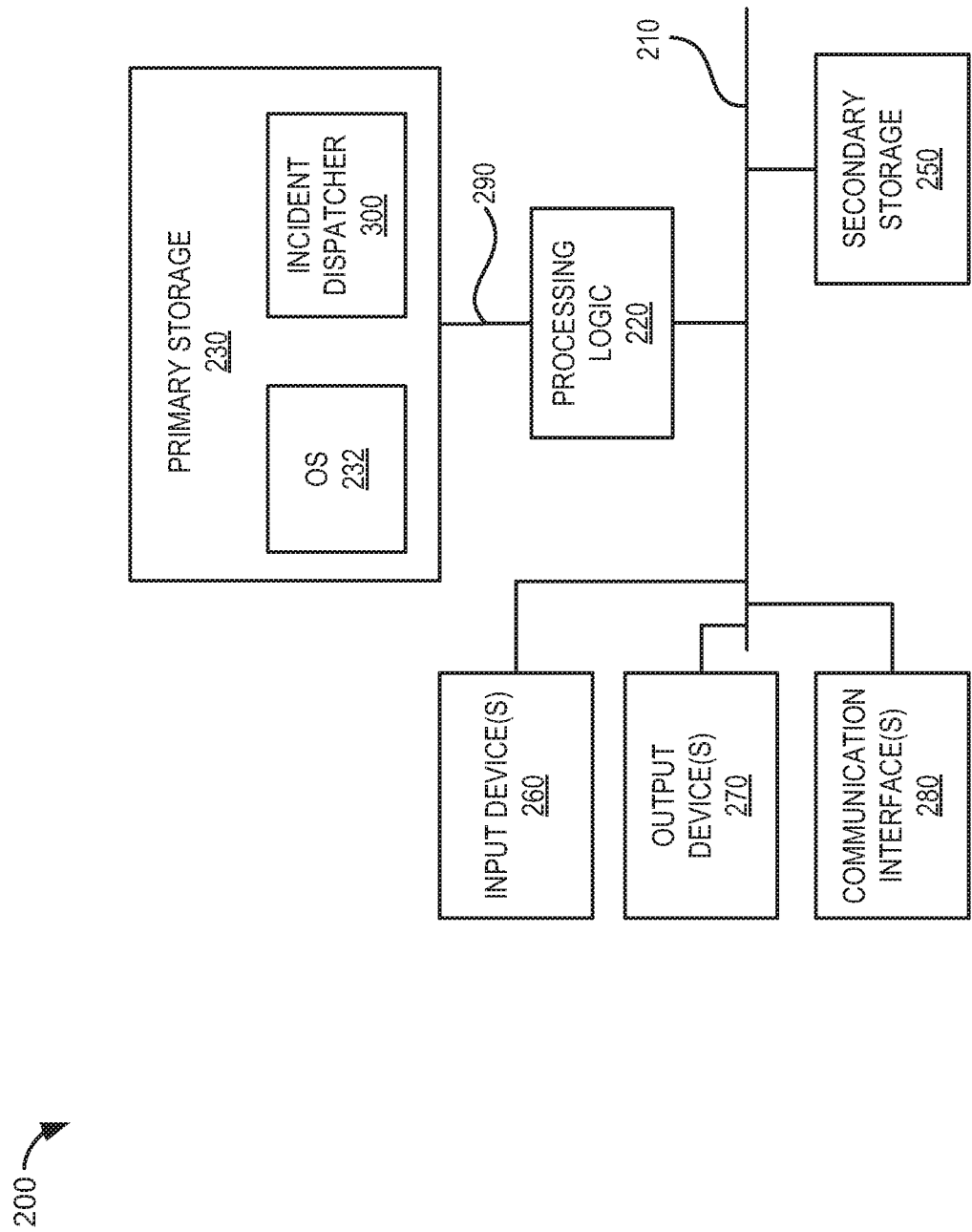
FIG. 2 illustrates a block diagram of an example of a computing device that may included in a command center node (CCN)

As noted above, CCN 130 may include a computing device. FIG. 2 illustrates a block diagram of an example of a computing device 200 that may be included in CCN 130. Referring to FIG. 2, computing device 200 may include various components, such as, an input-output (I/O) bus 210, processing logic 220, primary storage 230, secondary storage 250, one or more input devices 260, one or more output devices 270, one or more communication interfaces 280, and memory bus 290.

I/O bus 210 may be an interconnect bus that enables communication among various components in computing device 200. These components may include, for example, processing logic 220, secondary storage 250, input devices 260, output devices 270, and communication interfaces 280. The communication may include, among other things, transferring information (e.g., control information, data) between the components.

Memory bus 290 may be an interconnect bus that enables information to be transferred between processing logic 220 and primary storage 230. The information may include instructions and/or data that may be executed, manipulated, and/or otherwise processed by processing logic 220. The information may be stored in primary storage 230.

Processing logic 220 may include logic for interpreting, executing, and/or otherwise processing information contained in, for example, primary storage 230 and/or secondary storage 250. Processing logic 220 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may interpret, execute, manipulate, and/or otherwise process the information. Processing logic 220 may comprise a single core or multiple cores. An example of a processor that may be used to implement processing logic 220 is the Intel Xeon processor available from Intel Corporation, Santa Clara, Calif.

Secondary storage 250 may include storage that may be accessible to processing logic 220 via I/O bus 210. The storage may store information for processing logic 220. The information may be executed, interpreted, manipulated, and/or otherwise processed by processing logic 220. Secondary storage 250 may include, for example, one or more storage devices, such as magnetic disk drives, optical disk drives, random-access memory (RAM) disk drives, flash drives, solid-state drives, or other storage devices. The information may be stored on one or more tangible computer-readable media contained in the storage devices. Examples of tangible computer-readable media that may be contained in the storage devices may include magnetic discs, optical discs, and memory devices (e.g., flash memory devices, static RAM (SRAM) devices, dynamic RAM (DRAM) devices, or other memory devices). The information may include data and/or computer-executable instructions.

Input devices 260 may include one or more devices that may be used to input information into computing device 200. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multi-point input device, discrete pointing device, and/or some other input device. The information may include spatial (e.g., continuous, multi-dimensional) data that may be input into computing device 200 using, for example, a pointing device, such as a computer mouse. The information may also include other forms of data, such as, for example, text that may be input using a keyboard.

Output devices 270 may include one or more devices that may output information from computing device 200. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device. Output devices 270 may be directed by, for example, processing logic 220, to output the information from computing device 200. The information may be presented (e.g., displayed, printed) by output devices 270. The information may include, for example, graphical user interface (GUI) elements (e.g., windows, widgets, and/or other GUI elements), path and/or status information associated with an MR, status information associated with an SR, text, reports, and/or other information that may be presented by output devices 270.

Communication interfaces 280 may include logic for interfacing command center 200 with, for example, one or more communication networks and enable command center 200 to communicate with one or more entities coupled to the communication networks. For example, computing device 200 may include a communication interface 280 for interfacing computing device 200 to network 120. The communication interface 280 may enable computing device 200 to communicate with nodes that may be coupled to network 120, such as SRNs 500*a-b*, MRNs 400*a-b*, CN 150, and TN 170. Note that computing device 200 may include other communication interfaces 280 to connect to other communications networks.

Communication interfaces 280 may include one or more transceiver-like mechanisms that enable computing device 200 to communicate with entities (e.g., nodes) coupled to the communications networks. Examples of communication interfaces 280 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing computing device 200 to a communications network.

Primary storage 230 may include one or more tangible computer-readable media that may store information for processing logic 220. Primary storage 230 may be accessible to processing logic 220 via bus 290. The information may include computer-executable instructions and/or data that may implement operating system (OS) 132 and incident dispatcher 300. The instructions may be executed, interpreted, and/or otherwise processed by processing logic 220.

Primary storage 230 may comprise a RAM that may include one or more RAM devices for storing information (e.g., data, executable instructions, or other information). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 232 may be a conventional operating system that may implement various conventional operating system functions that may include, for example, (1) scheduling one or more portions of incident dispatcher 300 to run on the processing logic 220, (2) managing primary storage 230, and (3) controlling access to various components in command center 200 (e.g., input devices 260, output devices 270, network interfaces 280, secondary storage 250) and information received and/or transmitted by these components. Examples of operating systems that may be used to implement OS 232 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

It should be noted that computing device 200 is an example of a computing device that may be included at CCN 130. CCN 130 may include other computing devices that may have more components or fewer components than the components illustrated in FIG. 2. Also, functions performed by various components contained in the computing devices may be distributed among the components differently than as described herein. Further, functions performed by various components may be distributed across multiple devices. For example, functions performed by incident dispatcher 300 may be distributed across, for example, client-server devices, mobile devices (e.g., smart phones), and/or various data centers.

Figure 3:
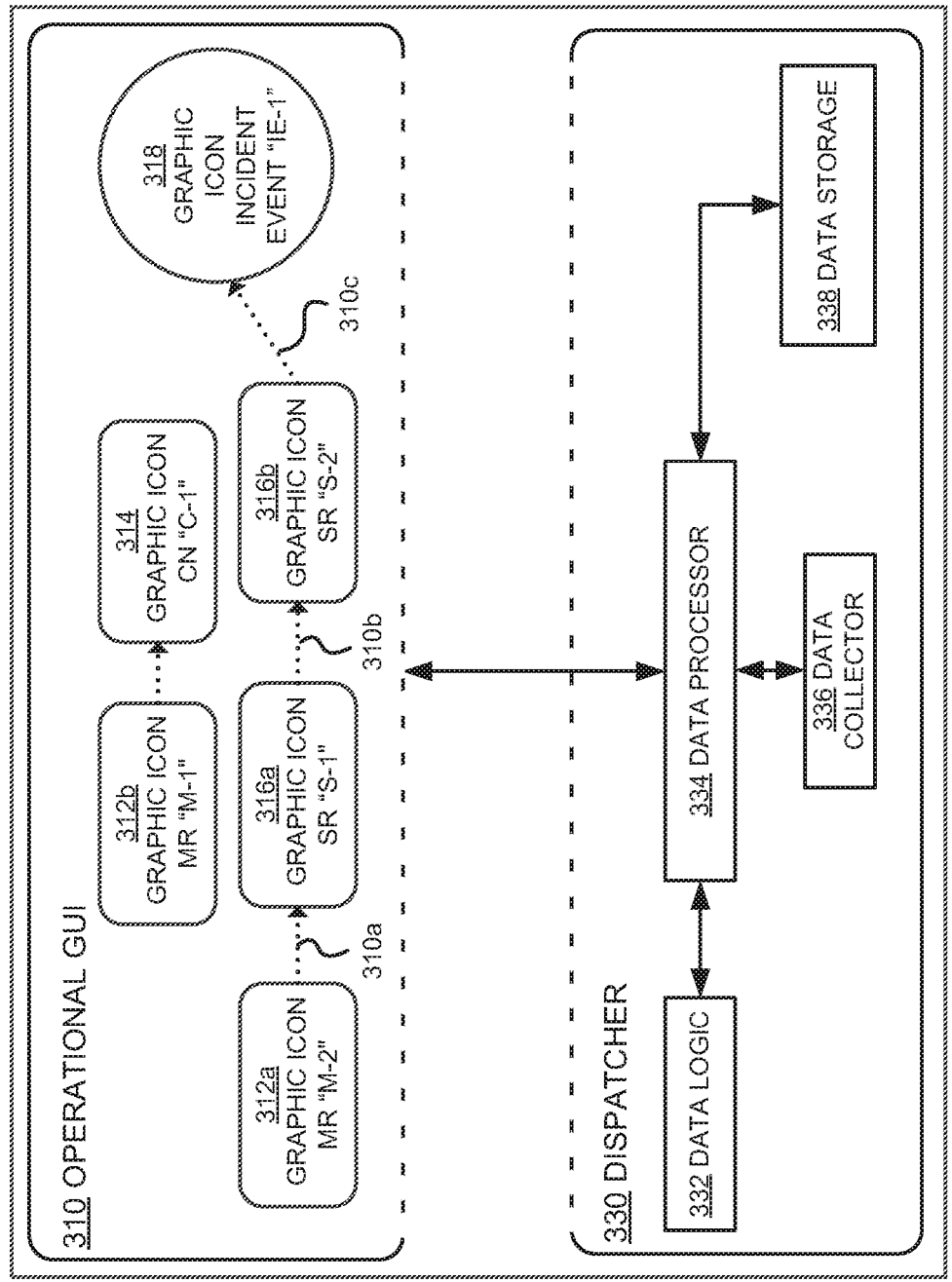
FIG. 3 illustrates a block diagram of an example of an incident dispatcher.

FIG. 3 illustrates a block diagram of an example embodiment of incident dispatcher 300. Referring to FIG. 3, incident dispatcher may include an operational GUI 310 and a dispatcher 330. The operational GUI 310 may include an interface (e.g., a GUI) that may present information about resources that may be associated with an incident. The information may include, for example, operational status and/or capabilities associated with the resources. Further, the interface may include provisions for presenting information about one or more incidents that may be handled by the resources.

Resource and incident information may be presented in GUI 310 using various graphical and/or textual affordances, such as icons, text, animation, and/or pictures. For example, MRs may be represented by icons 312a-b, SRs by icons 316a-b, a constraint node by icon 314, and an incident by icon 318. Note that other ways of presenting the information may be provided by GUI 310.

A path that may be taken by a resource (e.g., an MR) assigned to an incident may also be presented in GUI 310 using various graphical and/or textual affordances. For example, arrows 310a-c may represent a path taken by an MR, represented by icon 312a, to the incident, represented by icon 318.

GUI 310 may also present a status of a resource and/or incident. For example, icon 312a may be colored a first color to indicate that the MR, represented by icon 312a, contains various capabilities (e.g., an EMT, defibrillator, oxygen) that may be necessary to respond to the incident. Icon 312a may be colored a second color to indicate that the MR has been assigned to the incident, represented by icon 318. Further, as the MR travels along the path to the incident, icon 312a may be colored various colors which represent various statuses of the MR along the path. For example, a coloring scheme may be used to indicate a proximity of the MR to the incident or whether the MR has become disabled while en route to the incident.

Icons 316a-b could be presented in various ways to indicate a status associated with the SRs represented by the icons. For example, as the MR, represented by icon 312a, approaches an SR, represented by icon 316a, the SR may change its mode of operation to accommodate the MR. This change in mode may be reflected in a presentation of icon 316a using, for example, coloring, flashing, and/or highlighting.

Dispatcher 330 may include data logic 332, data processor 334, data collector 336, and data storage 338. Data logic 332 may contain logic (e.g., rules) for processing data that may be collected by the data collector 336 and/or provided by data storage 338. The logic may define, for example, how data processor 334 interprets the data, processes the data, and/or presents the data in GUI 310.

Data collector 336 may collect data from various sources. The data may be used by data processor 334. The data may include information about an incident and/or resources associated with the incident. For example, the data may include a type of an incident, seriousness of the incident, information about entities (e.g., victims, objects) involved in the incident, resources (e.g., MRs, SRs) assigned to the incident, constraints (e.g. traffic congestion) along paths to the incident, and/or terminals (e.g., hospitals, medical centers, clinics) that may be associated with the incident.

Data storage 338 may contain data that may also be processed by data processor 334. This information may include, for example, capabilities of resources (e.g., whether an MR contains an EMT, whether an SR may be controlled) that may be assigned to the incident. For example, an incident may involve an accident that requires a victim to be transported to a hospital. Further, the victim's injuries may be such that some of them require immediate medical attention. Data storage 338 may contain a database that stores information about resources (e.g., ambulances, EMTs) that may be dispatched to the site of the incident to provide these requirements.

Data processor 334 may process data collected by data collector 336 and/or data contained in data storage 338 according to logic that may be defined by data logic 332. The processed data may be presented in GUI 310. For example, data collector 336 may collect information about an incident. The information may include various characteristics (attributes) associated with the incident, such as a type of incident, number of injuries, severity of injuries, type of property damage, and so on. Based on the collected information and/or information contained in data storage 338, data processor 334 may identify one or more MRs that could respond to the incident. The MRs may be identified using one or more rules that may be defined in data logic 332.

Data processor 334 may display various icons in GUI 310 that represent the identified MRs. Data processor 334 may use various schemes (e.g., text, labeling, coloring, flashing, graphics) to indicate, for example, various characteristics associated with the MRs in GUI 310. For example, data processor 334 may use various schemes to indicate which MRs may be good, better, or best choices for responding to the incident. If a first MR contains capabilities that meet the requirements for responding to the incident but may take twenty minutes to reach the scene of the incident, an icon that represents the first MR may be displayed in a color that indicates "good" in GUI 310, whereas, a second MR that contains most but not all of the required capabilities and may take only 2 minutes to reach the scene may be displayed in a color that indicates "better" in GUI 310.

Using the GUI 310, a user may select resources to respond to the incident based on, for example, a presentation of icons that may represent the resources. For example, the user may select resources based on colors of the icons representing those resources.

The selections may be collected by data collector 336 and processed by data processor 334 according to logic that may be defined by data logic 332. The processing may include recording the user's selections and a date and time of the selection in data storage 338. Moreover, additional processing may be performed by data processor 334. For example, data processor may assign a selected MR to the incident and identify a path the MR may take to reach the location of the incident.

Figure 4:
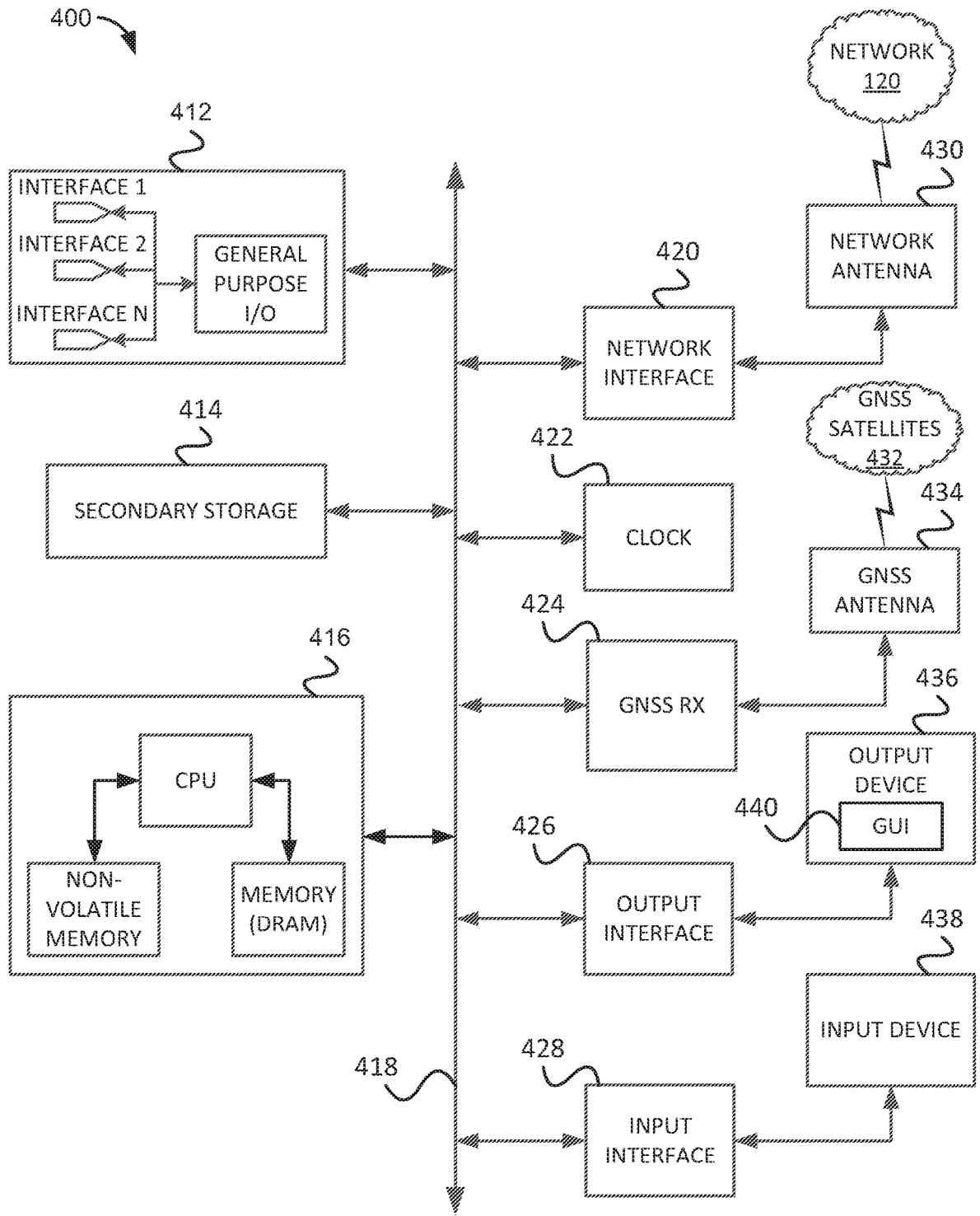
FIG. 4 illustrates a block diagram of an example of a mobile resource node (MRN) that may be associated with a mobile resource (MR)

FIG. 4 illustrates a block diagram of an example of an MRN 400. Referring to FIG. 4, an MRN 400 may contain various components that may include, for example, a general purpose I/O interface 412, secondary storage 414, processing logic 416, network interface 420, clock 422, global navigation satellite system (GNSS) receiver (RX) 424, output interface 426, input interface 428, network antenna 430, GNSS antenna 434, output device 436, and input device 438.

It should be noted that MRN 400 illustrated in FIG. 4 is an example of an MRN. Other MRNs that contain more components or fewer components than the components illustrated in FIG. 4 may be used. In addition, functions performed by the various components may be distributed among the components differently than described herein.

General purpose I/O interface 412 may be used to interface the MRN 400 with various external devices that may communicate using, for example, various general purpose I/O protocols. These external devices may include, for example, universal serial bus (USB) devices, FireWire devices (e.g. IEEE 1394 compatible devices), card readers, dongles, and/or other devices.

Secondary storage 414 may be a tangible non-transitory computer-readable medium that may provide secondary storage for MRN 400. Secondary storage 414 may be volatile, non-volatile, or some combination thereof. Secondary storage 414 may be implemented using, for example, disks, solid-state drives, flash memory devices, DRAM, SRAM, and/or other storage devices.

Processing logic 416 may include logic for interpreting, executing, and/or otherwise processing information. The information may include computer-executable instructions and/or data. The information may also include information provided by devices coupled to bus 418, such as, for example, network interface 420, clock 422, GNSS RX 424, output interface 426, and input interface 428. The information may be contained in, for example, (1) memory and/or non-volatile memory that may be part of the processing logic 416 and/or (2) secondary storage 414. The memory and non-volatile memory that may be part of processing logic 416 may be a tangible non-transitory computer-readable medium.

Processing logic 416 may include a central processing unit (CPU). The CPU may include, for example, some combination of one or more processors, microprocessors, field programmable gate arrays (FPGAs), application specific instruction set processors (ASIPs), application specific integrated circuits (ASICs), complex programmable logic devices (CPLDs), GPUs, or other types of processing logic that may interpret, execute, manipulate, and/or otherwise process the information. Processing logic 416 may comprise a single core or multiple cores.

Bus 418 may be an interconnect bus that may enable information (e.g., data, control information) to be transferred between components that may be coupled to bus 418. These components may include, for example, general purpose I/O interface 412, secondary storage 414, processing logic 416, network interface 420, clock 422, GNSS RX 424, output interface 426, and input interface 428.

Network interface 420 may include logic for interfacing MRN 400 with, for example, one or more communication networks and enabling MRN 400 to communicate with one or more entities (e.g., nodes) coupled to the communication networks. For example, network interface 420 may interface MRN 400 with network 120 and enable MRN 400 to exchange information with other nodes that may be coupled to network 120, such as CCN 130, other MRNs 400, SRNs 500, TN 170, and CN 150.

Network interface 420 may include one or more transceiver-like mechanisms that may enable MRN 400 to communicate with entities coupled to the communications networks. The communication may include information that may be provided to processing logic 416 via bus 418. Examples of network interfaces 420 may include a built-in network adapter, network interface card (NIC), Personal Computer Memory Card International Association (PCMCIA) network card, card bus network adapter, wireless network adapter, Universal Serial Bus (USB) network adapter, modem, and/or other network interfaces suitable for interfacing MRN 400 to a communications network.

Clock 422 may include logic that may provide time and/or date information to an entity processing logic 416 via bus 418. The time and/or date information may be based on information that may be provided by an atomic clock service, such as the atomic clock-based date and/or time provided by the National Institute of Standards and Technology (NIST), Boulder, Colo. The time and/or date information provided by the atomic clock service may be acquired by clock 422 using a receiver that receives the information via radio waves (e.g., WWVB), from a server (that may be coupled to the network 120), or otherwise acquired. It should be noted that the time and/or date information provided by clock 422 may be based on information provided by sources other than an atomic clock service.

GNSS RX 424 may include logic for receiving a GNSS signal and identifying a location of the MRN 400 based on, for example, the received GNSS signal. The location information may be provided to processing logic 416 via bus 418. The GNSS signal may be provided by one or more GNSS satellites 432 that may be part of a GNSS system. Examples of GNSS systems that may provide the GNSS signal include, for example, the United States Global Positioning System (GPS), Russian Global Navigation Satellite System (GLONASS), European Union Galileo Positioning System, Chinese Compass Navigation System, and/or the Indian Regional Navigational Satellite System.

Output interface 426 may include logic for presenting information on output device 436. For example, output interface 426 may include logic that enables text and/or graphics, which may be part of an operational GUI 440, to be displayed on output device 436. The logic may include a GPU, which may (1) build various display elements (e.g., widgets, graphics) and (2) render the display elements on output device 436. Output device 436 may include one or more devices for presenting the information. These devices may include, for example, a CRT, plasma display device, LED display device, LCD device, VFD device, SED device, FED device, touch screen and/or other output device.

Operational GUI 440 may include provisions for displaying, inter alia, a status of resources associated (e.g., assigned, dispatched) with an incident (e.g., MRs, SRs). For example, operational GUI 440 may contain provisions for displaying locations of MRs that are responding to the incident. MRN 400 may contain provisions to enable a user to specify what information may be displayed in operational GUI 440. For example, MRN 400 may contain provisions for displaying resources that are responding to the event based on the type of resources and/or other criteria (e.g., MRs that are within a predetermined radius of the MRN 400) in operational GUI 440.

Input interface 428 may contain logic for acquiring various input information that may be provided by a user and/or other source. The input information may be acquired (read, received) via input device 438. The input information may be made available by input interface 428 via bus 418 to an entity connected to the bus 418, such as processing logic 416 and/or output interface 426.

Input device 438 may include one or more devices that may be used to acquire the input information for MRN 400. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), sensors (e.g., temperature sensors, humidity sensors, electronic compass), pointing stick, accelerometer, or other input devices. The acquired input information may be transferred from the devices to input interface 428.

Figure 5:
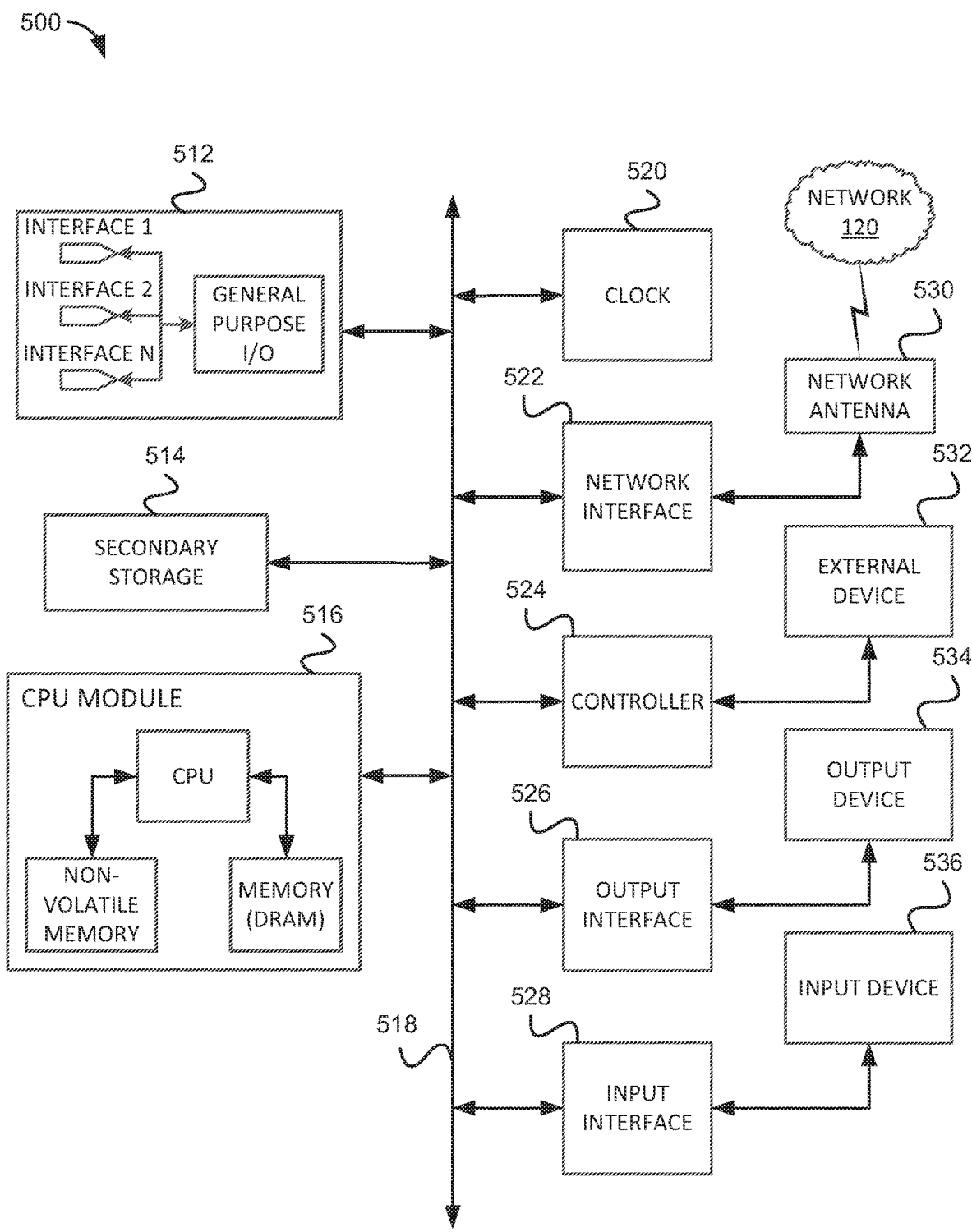
FIG. 5 illustrates a block diagram of an example of a stationary resource node (SRN) that may be associated with a stationary resource (SR)

FIG. 5 illustrates a block diagram of an example of an SRN 500. Referring to FIG. 5, SRN 500 may include various components, such as, for example, a general purpose I/O interface 512, secondary storage 514, processing logic 516, clock 520, network interface 522, controller 524, output interface 526, input interface 528, network antenna 530, external device 532, output device 534, and input device 536.

It should be noted that SRN 500 illustrated in FIG. 5 is an example of an SRN. Other SRNs that contain more components or fewer components than the components illustrated in FIG. 5 may be used. In addition, functions performed by the various components may be distributed among the components differently than described herein.

General purpose I/O interface 512 may be used to interface SRN 500 with various external devices that may communicate with SRN 500 using various general purpose I/O protocols. These external devices may include, for example, universal serial bus (USB) devices, FireWire devices (e.g. IEEE 1394 compatible devices), card readers, dongles, and/or other devices.

Secondary storage 514 may be a tangible non-transitory computer-readable medium that may provide secondary storage for SRN 500. Secondary storage 514 may be volatile, non-volatile, or some combination thereof. Secondary storage 514 may include, for example, disks, solid-state drives, flash memory devices, DRAM, SRAM, and/or other storage devices.

Processing logic 516 may include logic for interpreting, executing, and/or otherwise processing information. The information may include computer-executable instructions and/or data. The information may also include information provided by devices coupled to bus 518, such as, for example, clock 520, network interface 522, controller 524, output interface 526, and input interface 528. The information may be contained in, for example, (1) memory and/or non-volatile memory that may be part of the processing logic 516 and/or (2) secondary storage 514. The memory and non-volatile memory that may be part of processing logic 516 may be a tangible non-transitory computer-readable medium.

Processing logic 516 may include a central processing unit (CPU). The CPU may include, for example, some combination of one or more processors, microprocessors, field programmable gate arrays (FPGAs), application specific instruction set processors (ASIPs), application specific integrated circuits (ASICs), complex programmable logic devices (CPLDs), GPUs, or other types of processing logic that may interpret, execute, manipulate, and/or otherwise process the information. Processing logic 516 may comprise a single core or multiple cores.

Bus 518 may be an interconnect bus that may enable information (e.g., data, control information) to be transferred between components that may be coupled to bus 518. These components may include, for example, general purpose I/O interface 512, secondary storage 514, processing logic 516, clock 520, network interface 522, controller 524, output interface 526, and input interface 528.

Clock 520 may include logic that may provide time and/or date information to an entity processing logic 516 via bus 518. The time and/or date information may be based on information that may be provided by an atomic clock service, such as the atomic clock-based date and/or time provided by the National Institute of Standards and Technology (NIST), Boulder, Colo. The time and/or date information provided by the atomic clock service may be acquired by clock 520 using a receiver that receives the information via radio waves (e.g., WWVB), from a server (that may be coupled to the network 120), or otherwise acquired. It should be noted that the time and/or date information provided by clock 520 may be based on information provided by sources other than an atomic clock service.

Network interface 522 may include logic for interfacing SRN 500 with, for example, one or more communication networks and enabling SRN 500 to communicate with one or more entities connected to the communication networks. For example, network interface 522 may interface SRN 500 with network 120 and enable SRN 500 to exchange information with other entities that may be connected to network 120, such as CCN 130, MRNs 400, other SRNs 500, TN 170, and CN 150.

Network interface 522 may include one or more transceiver-like mechanisms that may enable SRN 500 to communicate with entities coupled to the communications networks. The communication may include information that may be provided to processing logic 516 via bus 518. Examples of network interfaces 520 may include a built-in network adapter, network interface card (NIC), Personal Computer Memory Card International Association (PCM-CIA) network card, card bus network adapter, wireless network adapter, Universal Serial Bus (USB) network adapter, modem, and/or other network interfaces suitable for interfacing SRN 500 to a communications network.

Controller 524 may include logic for controlling one or more external devices 532 associated with the SR. Moreover, controller 524 may include logic for acquiring information about one or more external devices 532 associated with the SR.

For example, the SR may be an intersection that is controlled by a traffic light and the controller may be used to control turning on or off one or more lights associated with the traffic light. The lights may be turned on or off based on one or more commands that may be sent to the controller 524 from a component (e.g., processing logic 516) coupled to bus 518. In addition, controller 524 may provide a status of a light. For example, if a light is inoperative (e.g., burned out), controller 524 may be able to provide this status. The status may be provided to a component coupled to bus 518.

Output interface 526 may include logic for presenting information on output device 536. For example, output interface 526 may include logic that enables text and/or graphics, which may be part of an operational GUI, to be displayed on output device 536. The logic may include a GPU, which may build various display elements (e.g., widgets, graphics, text, labels) and render the display elements on output device 536. Output device 534 may include one or more devices for presenting the information. These devices may include, for example, a CRT, plasma display device, LED display device, LCD device, VFD device, SED device, FED device, touch screen and/or other output device.

Input interface 528 may contain logic for acquiring various input information that may be provided by a user or other source. The input information may be acquired via input device 536. The input information may be made available by input interface 528 via bus 518 to an entity connected to the bus 518, such as processing logic 516 and/or output interface 526.

Input device 536 may include one or more devices that may be used to acquire input information for SRN 500. The information may be provided, for example, by a user or other source. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), sensors (e.g., temperature sensors, humidity sensors, electronic compass), pointing stick, accelerometer, and/or other input devices. The acquired input information may be transferred to input interface 528.

Figure 6A:
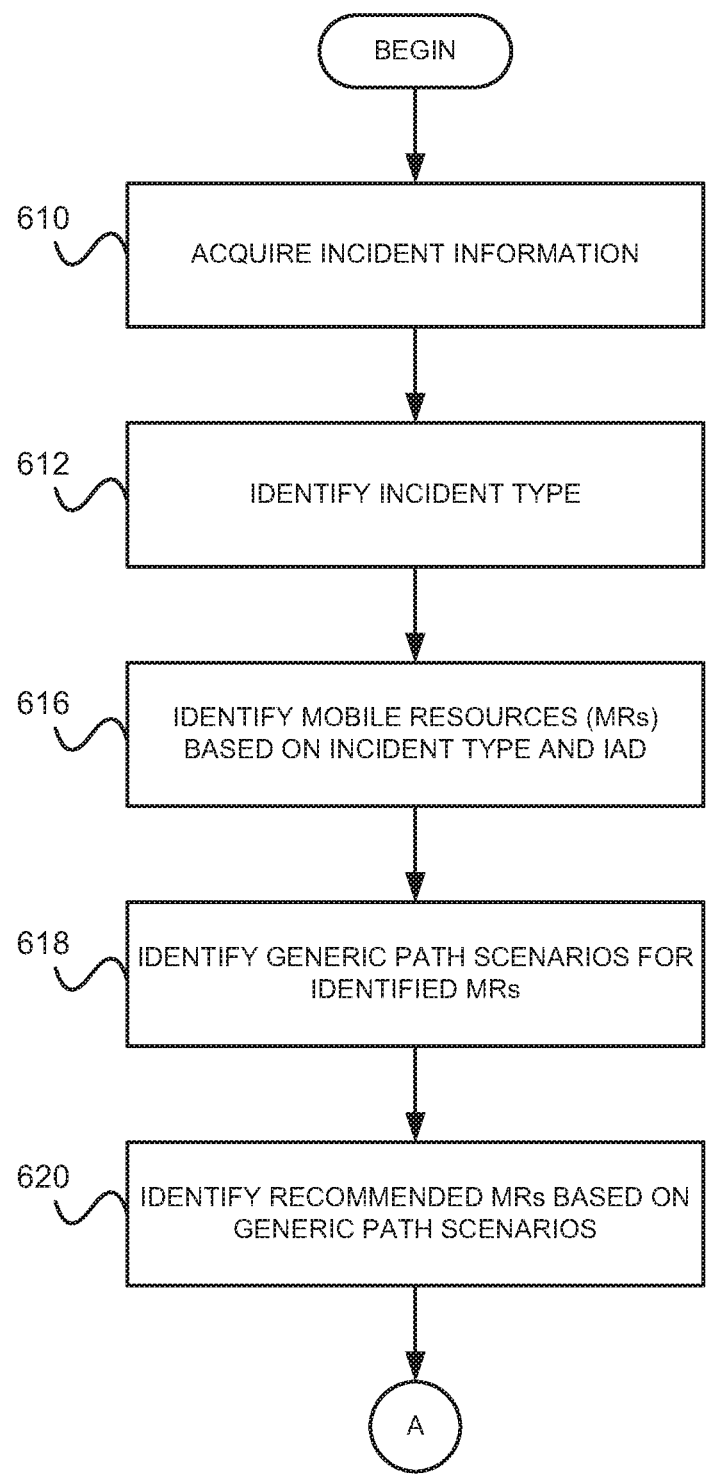
FIGS. 6A-D illustrate a flow diagram of example acts that may performed to respond to an incident.
Figure 6B:
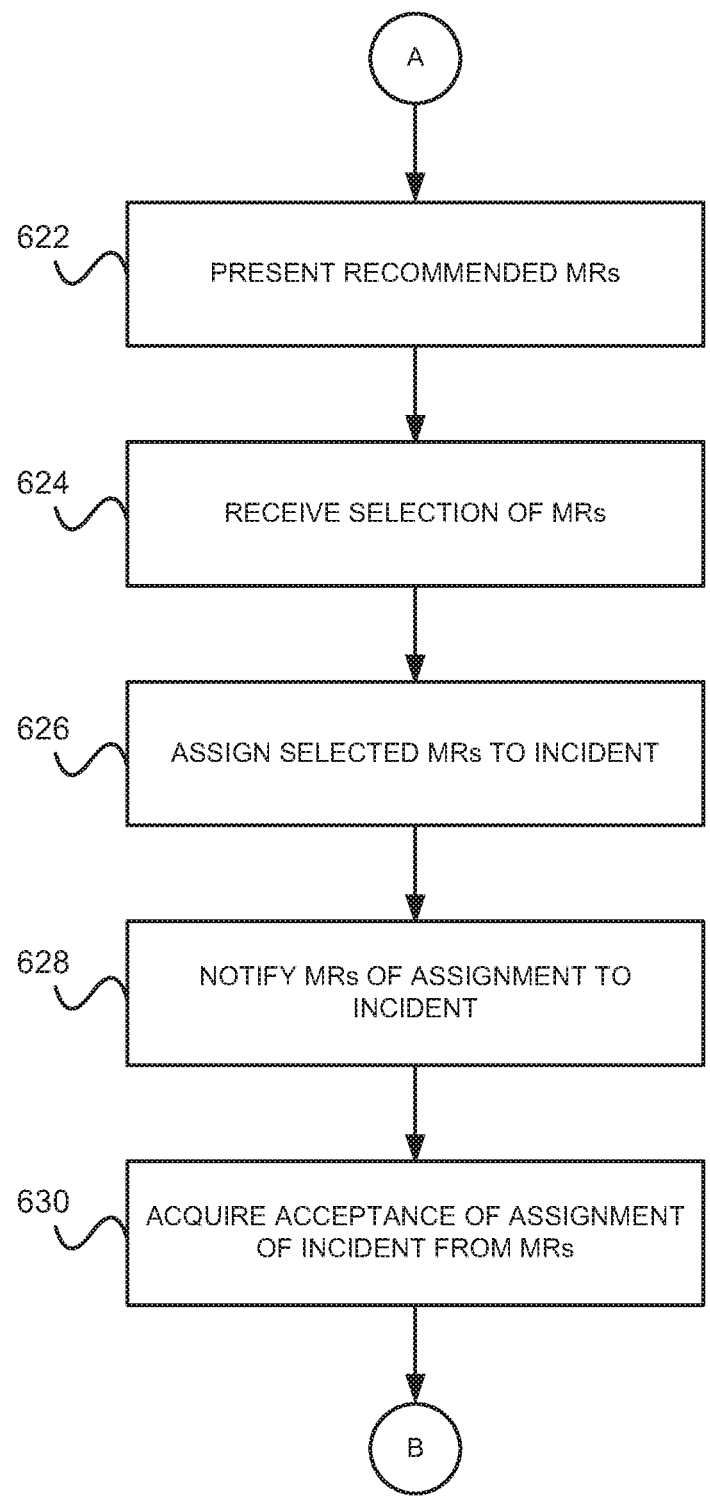
Figure 6C:
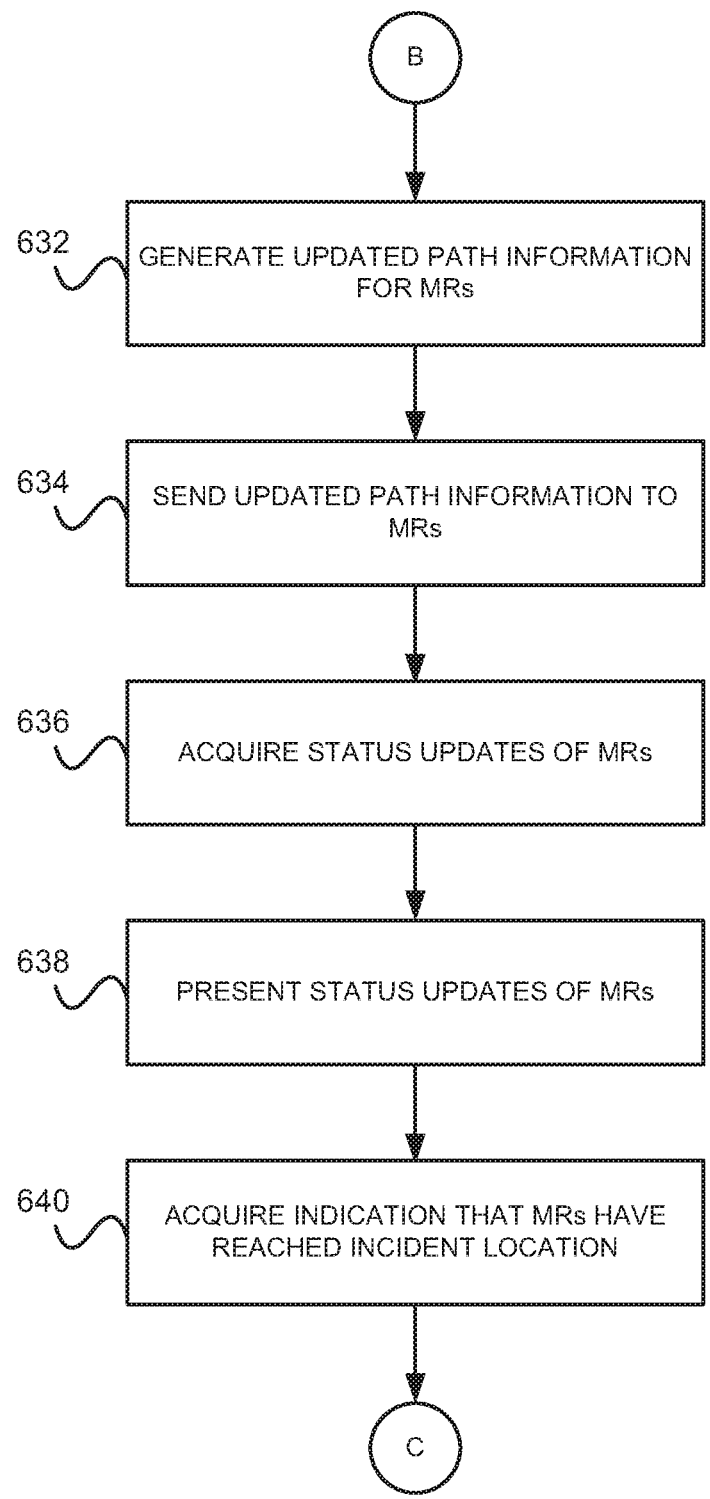
Figure 6D:
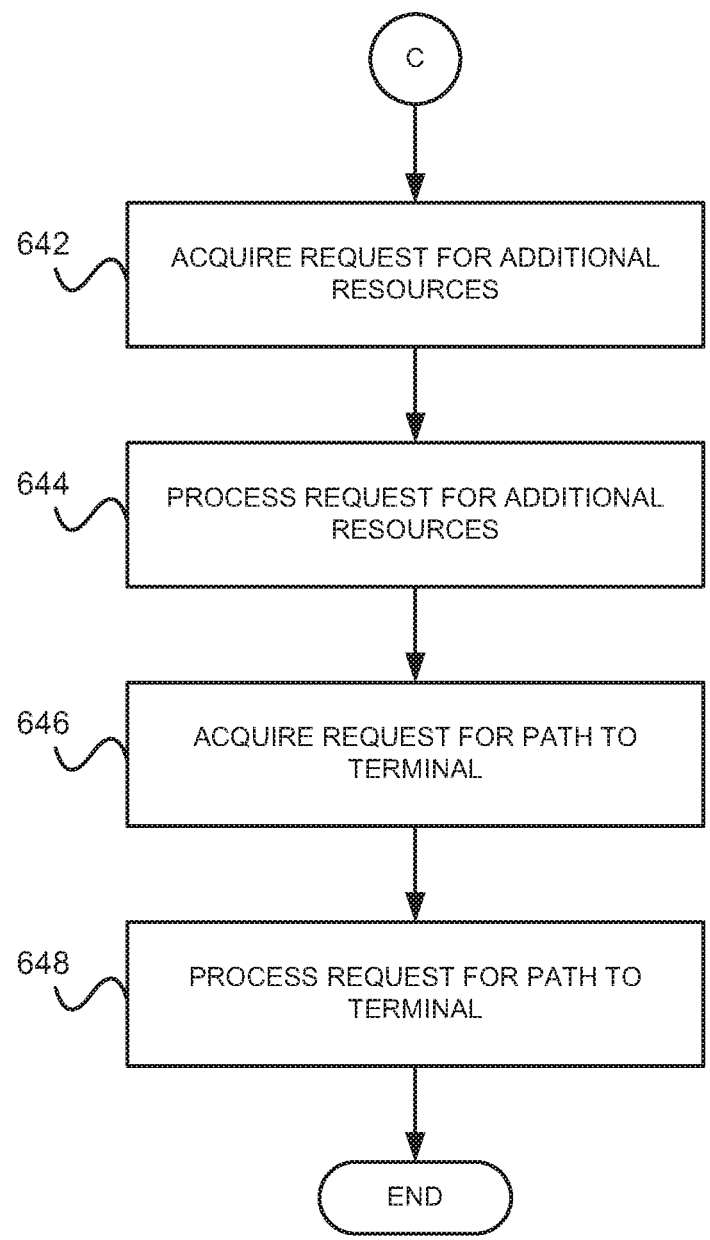

FIGS. 6A-D illustrate a flow diagram of example acts that may performed to respond to an incident. Acts illustrated in FIGS. 6A-D may be performed by IRMS 100. Referring to FIG. 6A, at block 610 information about an incident may be acquired. The information may be acquired by data collector 336 from various sources, such as network 120, an MRN 400, SRN 500, a 911 operator, and/or other source.

For example, information may be input (e.g., manually, automatically) into CCN 130 (FIG. 1) via an input device 260 (FIG. 2), an MRN 400 (FIG. 4) via input device 438, and/or an SRN 500 (FIG. 5) via input device 536 and/or external device 532. Information may be transferred to CCN 130 via network 120. At CCN 130, data collector 336 may acquire the information by reading the information (e.g., from an input device 260), receiving the information (e.g., via the network 120), and/or otherwise acquiring the information. Data collector 336 may provide the acquired information to data processor 334. The information provided to data processor 334 may be filtered (e.g., prescreened), for example, by data collector 336.

The information may include various characteristics of the incident, such as type of incident, geographic location of the incident, number of vehicles involved, number of injuries, severity of injuries, type of injuries, types of property damage, extent of property damage, and/or other information that may be associated with the incident.

At block 612 a type of the incident may be identified. The type of the incident may be identified from information acquired at block 610. For example, the incident could be a multi-vehicle crash and the acquired information may include a code that identifies the incident as a multi-vehicle crash. The incident type may be identified from the code.

As noted above, the information acquired at block 610 may be acquired by data collector 336. The information may be provided to the data processor 334 by data collector 336. An incident type may be identified by data processor 334 from the acquired information provided by data collector 336. Data processor 334 may use data logic 332 to identify the incident type from the provided information.

At block 616, one or more MRs may be identified based on, for example, the identified incident type, the acquired information, and/or information about one or more capabilities associated with the MRs. Information about capabilities associated with the MRs may be stored in data storage 338. The MRs may be identified by data processor 334 using information provided by the data collector 336 and/or data storage 338, and logic that may be defined by data logic 332.

For example, data collector 336 may acquire information about an incident and provide the information to data processor 334. Data processor 334 may process the information based on one or more rules contained in data logic 332. Based on this processing, data processor 334 may determine that the incident involves injuries that warrant an ambulance. Data processor 334 may query data storage 338 for information related to ambulances within a certain radius of a geographic location of the incident. Data logic 332 may be used by data processor 334 to formulate the query. Moreover, data logic 332 may provide data processor 334 with logic for identifying one or more potential ambulances that may be used to respond to the incident.

At block 618, one or more generic path scenarios may be identified for the MRs that were identified at block 616. The generic path scenarios may include paths that may be taken by MRs to the incident. The generic path scenarios may be used to identify recommended MRs to handle the incident.

The generic path scenarios may be based on various criteria, such as, for example, an expected amount of time that it may take an MR to respond to the incident. The generic path scenarios may take into consideration such factors as a geographic location of an MR, history of congestion of certain paths, day, time of day, physical road conditions, a geographic location of the incident, and/or other factors. Factors used to determine the generic path may be identified based on the incident type and/or acquired information.

The generic path scenarios may be identified by, for example, data processor 334 using logic that may be provided by data logic 332 and data that may be provided by data collector 336 and/or data storage 338. Data used to identify the generic path scenarios may be collected by data collector 336 from various sources, such as an input device 260, MRN 400, SRN 500, CN 150, and/or other sources.

At block 620, recommended MRs that may respond to the incident may be identified. The recommended MRs may be identified based on the generic path scenarios identified at block 618. For example, generic path scenarios may be analyzed by data processor 334 using logic provided by data logic 332. The analysis may identify a first group of MRs that may reach the incident within a certain time window and a second group of MRs may not reach the incident outside of the time window. Based on this analysis, the data processor 334 may identify recommended MRs from the first group of MRs.

At block 622 (FIG. 6B), the recommended MRs may be presented. The recommended MRs may be presented in a display that is provided by an output device. For example, after identifying the recommended MRs, data processor 334 may display a list of icons in GUI 310 that indicate which MRs are recommended. The icons may be displayed on output device 270.

At block 624, a selection of the MRs may be acquired. The selection may indicate that a first MR is preferred over a second MR with respect to responding to the incident. The selection may be made, for example, manually (e.g., by a user), automatically (e.g., by data processor 334), or some combination thereof. For example, after displaying icons that represent the recommended MRs, data processor 334 may receive a selection of one or more MRs from a user via an input device 260.

The selection may be based on generic path scenarios for the MRs. For example, a first MR may be deemed preferred over a second MR with respect to responding to the incident based on a generic path scenario for the first MR and a generic path scenario for the second MR.

At block 626, one or more selected MRs may be assigned to the incident. The MRs may be assigned, for example, manually, automatically, or some combination thereof. Assignment may involve setting a status of an MR to indicate that the MR has been assigned to the incident. The status may be set by data processor 334 and maintained in data storage 338.

At block 628, the MRs assigned to the incident may be notified that they have been assigned to the incident. Notification may include sending a message to an MR that indicates the MR is assigned to the incident. For example, suppose that an MR associated with MRN 140*a* is assigned to an incident. Data processor 334 may generate a message and transfer the message to the MRN 140*a* via network 120. MRN 140*a* may receive the message via network interface 420. Processing logic 416 may process the message and display a notification (e.g., a popup window) on output device 436 that indicates that the MR has been assigned to the incident.

At block 630, an acceptance of the assignment to the incident may be acquired from the MR. For example, suppose in the above example, that after displaying the notification, processing logic 416 receives an indication from a user operating the MRN 140*a* that the assignment has been accepted. Processing logic 416 may send a message via network interface 420 and network 120 to CCN 130 to indicate that the assignment has been accepted. CCN 130 may receive the message from the network 120 and data processor 334 may process the received message including determining that the MR has accepted the assignment.

At block 632 (FIG. 6C), updated path information may be generated for the MRs that have accepted the assignment. The updated path information may be based on a generic path scenario that may have been identified at block 618, updated traffic patterns information, updated weather information, current incident status, updated road conditions, changes in various constraints that may have been used to determine the generic path information, and/or other information. The information may be acquired from various sources, such as the Internet, MRNs 400, SRNs 500, CNs 150, and/or other sources. The information may be collected by data collector 336 and processed by data processor 334, which may generate the updated path information based on the collected data and logic provided by data logic 332.

At block 634, updated path information may be sent to MRs that have accepted the assignment. The updated path information may be sent to the MRNs 400 associated with the MRs in the form of a message that is sent via network 120. After receiving a message containing the updated path information, an MRN 400 may display the updated path information on output device 436.

At block 636, periodic status updates may be acquired from the MRs that have accepted the assignment and at block 638 a present status of the MRs is updated. For example, an MRN 400 associated with an MR that is traveling to the incident may send messages via network 120 to CCN 130. The messages may contain status information, such as an availability of the MR, location of the MR, and/or other status information. CCN 130 may acquire the messages and process the acquired messages. The messages may be processed by data processor 334. Data processor 334 may update data storage 338 based on the status information contained in the message. Moreover, data processor 334 may update GUI 310 to reflect the status of the MR.

At 640, an indication that the MRs have reached the location of the incident may be acquired. For example, after reaching the location of the incident, an MRN 400 associated with an MR may send a message to CCN 130, via network 120, that indicates the MR has reached the location of the incident. The CCN 130 may update GUI 310 to indicate that the MR has reached the location of the incident.

At block 642 (FIG. 6D), a request for additional resources may be acquired. For example, after reaching the location of the incident, a responder may determine that additional resources are needed to handle the incident. The responder may send a message via an MRN 400 to CCN 130 to request the additional resources. The message may be sent via network 120 and received at the CCN 130 via communication interface 280. The acquired message may be forwarded to data collector 336. Data processor 334 may acquire the message from data collector 336 and process the message. At block 644, the request for additional resources may be processed. The request may be processed by data processor 334. Processing may involve identifying additional MRs, such as described above.

At block 646, a request may be acquired for a path to a terminal and at block 648, the request may be processed. For example, a responder may request a path to a hospital via an MRN 400. The request may be sent in the form of a message that may be sent to CCN 130 via network 120. CCN 130 may acquire the request and process it. Processing may include identifying a path from the location of the MR to the hospital. The path may be identified using information, such as described above. After identifying the path, CCN 130 may transfer the path to the MRN 400 via network 120, as described above. While en route to the terminal, the MRN 400 may provide status updates to the CCN 130 and the status updates may be displayed in GUI 310, such as described above. Further, the terminal may receive the status updates from the MRN 400 and/or the CCN 120. These updates may be processed by a TN 170 contained at the terminal. Processing may include providing a display of the status of the MR in a GUI at the TN 170.

Figure 7A:
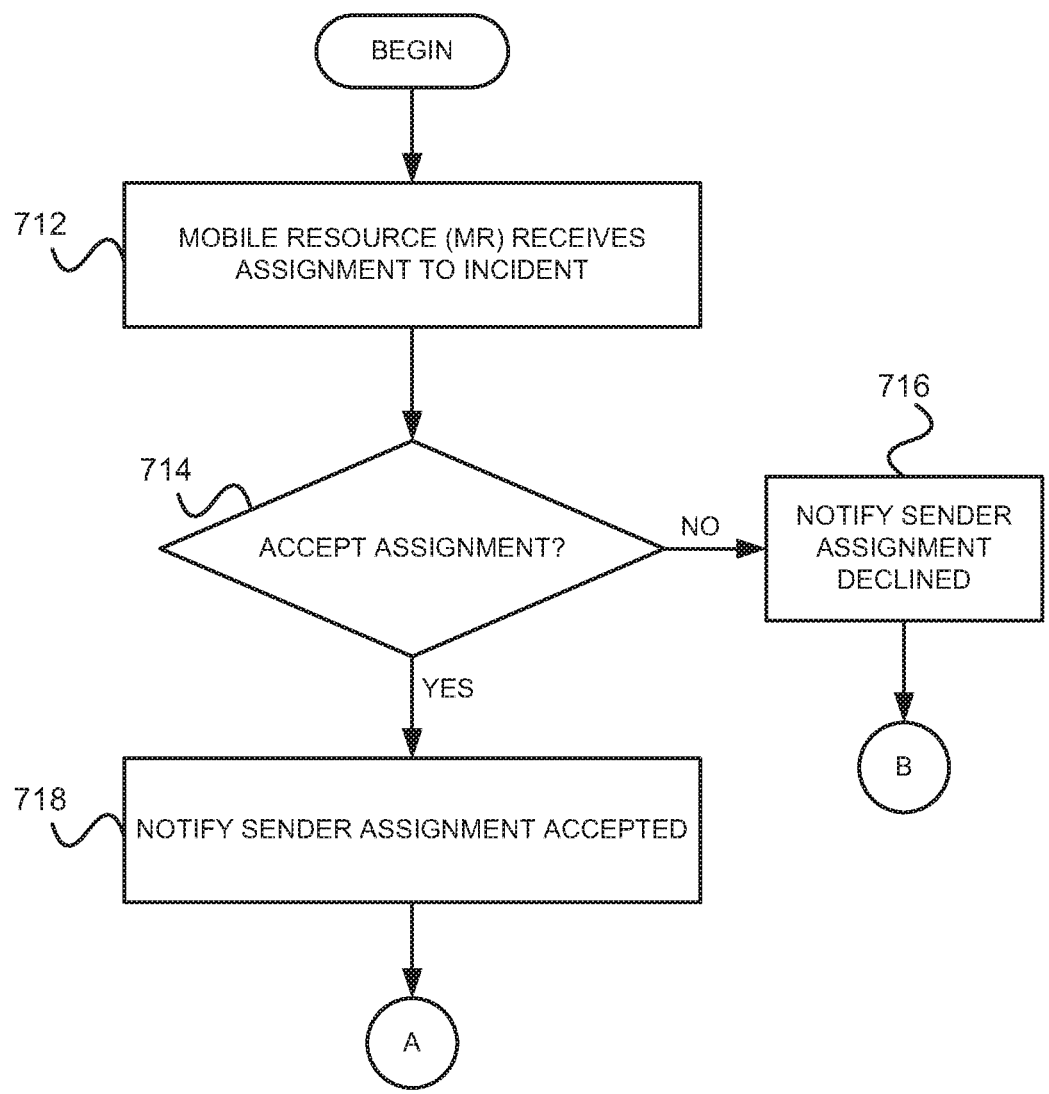
FIGS. 7A-B illustrate a flow diagram of example acts that may be performed by an MRN.
Figure 7B:
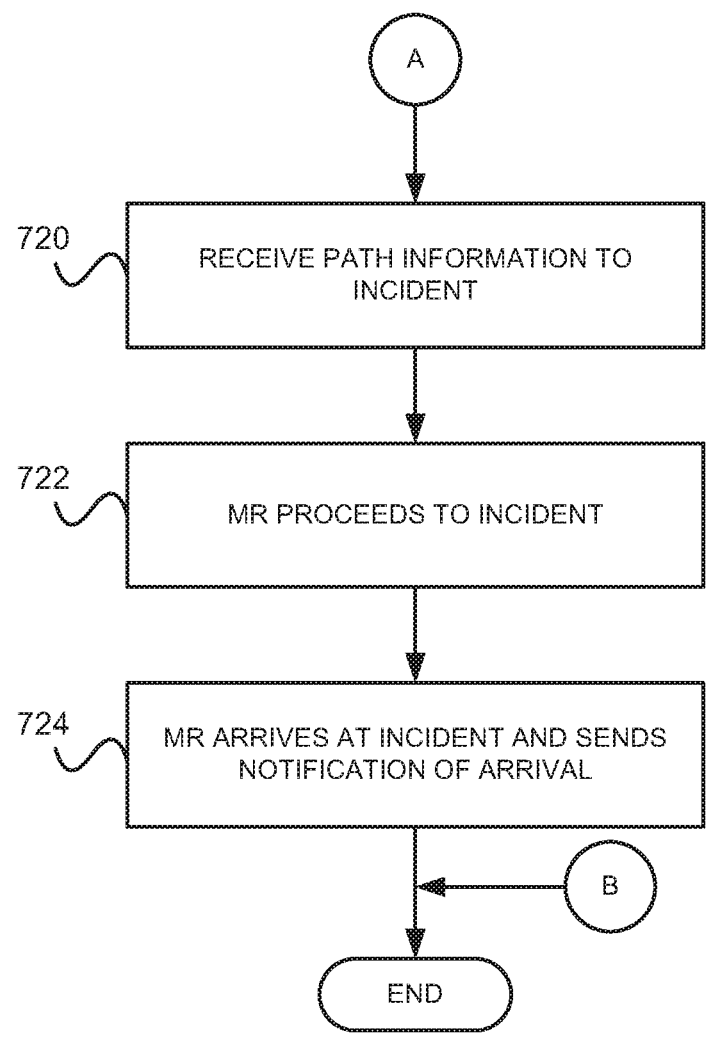

FIGS. 7A-B illustrate a flow diagram of example acts that may be performed by an MR. Referring to FIG. 7A, at block 712, an assignment to an incident is received. The assignment may be received in a message that is sent to an MRN 400 that is associated with the MR. At block 714, a check is performed to determine whether the assignment has been accepted. If the assignment is declined, at block 716, a notification is sent to indicate the assignment has been declined. If the assignment is accepted, at block 718 a notification is sent to indicate that the assignment has been accepted. Either notification may be sent to the sender of the assignment. Further, the notification may be contained in a message that is sent to the sender using the MRN 400.

At block 720 (FIG. 7B), path information to the incident is received. The path information may be received, for example, in a message sent to the MRN 400. At block 722, the MR proceeds to the incident. The MR may use the path information to identify a path to the incident. At block 724, the MR arrives at the location of the incident and sends a notification of the MR's arrival. The notification may be contained in a message that may be sent, for example, to the sender of the assignment using the MRN 400.

For example, suppose that CCN 130 receives information about an incident and determines that an MR should be assigned to the incident. Further, suppose that MRN 400a is associated with the MR. CCN 130 may generate a message containing the assignment and send the message to MRN 400a via network 120. The assignment may be received by MRN 400a, which may process the message. Processing the message may include displaying an indication of the assignment on output device 436. The indication may be displayed in GUI 440 that may be displayed on the output device 436. The GUI 440 may include provisions (e.g., a widget) to enable a user of the MRN 400a to indicate whether the assignment is accepted.

Now suppose the user accepts the assignment. The user may indicate that they accept the assignment via input device 438. MRN 400a may generate a message containing the indication and transfer the message onto network 120 via network interface 420. CCN 130 may receive the message at a communication interface 280. The message may be acquired from communication interface 280 by data collector 336. Data collector 336 may transfer the message to data processor 334. Data processor 334 may process the message in accordance with logic that may be defined by data logic 332. Processing the message may include updating a status of the resource in data storage 338 and displaying an indication in GUI 310 that the resource has accepted the assignment.

CCN 130 may generate path information for the MR, such as described above. CCN 130 may include the path information in a message that is transferred to the MRN 400a via network 120. MRN 400a may receive the message from the network 120 and process the message. Processing may include displaying the path information on output device 436. MR may then follow the path to the incident.

After arriving at the incident, MRN 400a may generate a message that includes an indication that the MR has arrived at the location of the incident. MRN 400a may transfer the message via network 120 to CCN 130. CCN 130 may receive the message from the network 120 and process the message. Processing may include updating a status of the resource in data storage 338 and displaying an indication in GUI 310 that the resource has arrived at the location of the incident.

Various SRs may be associated with a path that may be identified for an MR. The SRs may be located directly on the path or may be able to influence constraints (e.g., for example traffic congestion) associated with the path. For example, a first SR associated with a path may be associated with an intersection is on the path. The intersection may contain a traffic light that directly controls traffic on the path. A second SR associated with an intersection that is not on the path (e.g., may be a city block away). The intersection associated with the second SR may contain a traffic light that may be capable of influencing a flow of traffic on the path. For example, the traffic light associated with the second SR may be capable of controlling traffic that may flow into the path.

As an MR is en route to an incident, it may approach an SR. The SR may need to take action in order to accommodate the MR. For example, an SR may control an intersection on the path using a traffic light. The MR may be traveling at a high rate of speed and approaching the intersection. The SR may take action to ensure that the MR may be able to maintain its high rate of speed through the intersection. The action may include controlling the traffic light to ensure the intersection is clear when the MR reaches the intersection.

One way to accommodate an MR at a particular SR may be to monitor the location of the MR and when the MR reaches a trigger point, action may be taken at the SR to accommodate the MR. The trigger point may be a location along a path, taken by the MR to the incident, where the SR may need to take action in order to accommodate the MR. The trigger point may be identified based on, for example, a rate of speed of the MR, location of the MR, and/or direction of travel of the MR. Further, the MR and SR may utilize a synchronized time source (e.g., an atomic clock service) used by both the MR and SR to predict a location of the SR.

For example, an SRN 500 associated with the SR may utilize time and/or date information provided by clock 520 and information about a last known location of the MR (that may be provided by the MR's MRN 400), speed of the MR, and/or other information to predict where the MR may be located. The SRN 500 may use this predicted location to determine, for example, whether the MR has reached the trigger point.

After the MR passes the intersection, the SR may no longer need to accommodate the MR. Here, the SR may be released and return to normal operation and/or released to accommodate another MR. An SRN 500 associated with the SR may determine that the SR is released based on a message (e.g., a message containing the location of the MR), prediction of the location of the MR, and/or other criteria.

Figure 8:
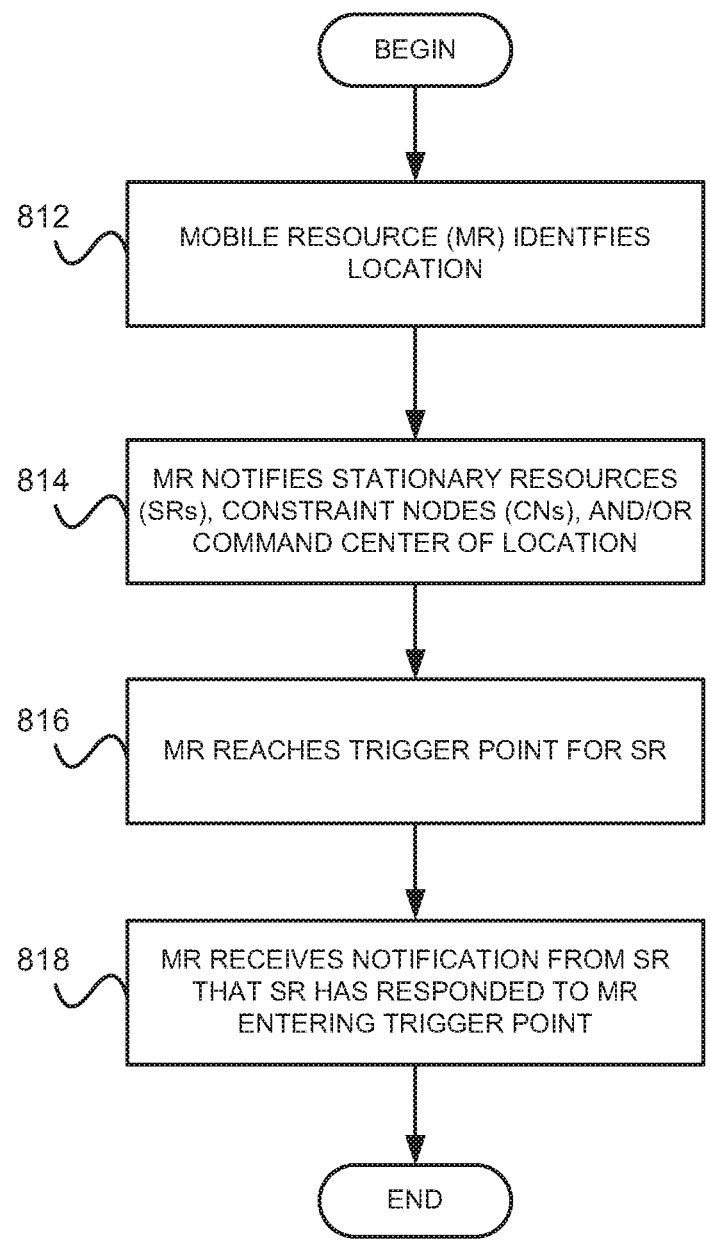
FIG. 8 illustrates a flow diagram of example acts that may be performed while an MR is en route to an incident.

FIG. 8 illustrates a flow diagram of example acts that may be performed while an MR is en route to an incident. Referring to FIG. 8, at block 812, an MR identifies its geographic location. The location may be identified by using GNSS RX 424 contained in an MRN 400 that may be associated with the MR. At block 814, the MR may notify one or more SRs associated with a path taken by the MR to the incident of the MR's location. In addition, the MR may notify a command center that has dispatched the MR to the incident of the MR's location and/or one or more constraints that may be on or near the path taken by the MR. A CN 150 associated with a constraint may process the notification and provide an indicator that indicates the MR is within a certain location of the CN 150. The CN 150 may respond to accommodate the MR. The indicator may be, for example, a visual indication (e.g., a flashing light, indication on a display screen), audio indication (e.g., sound), and/or other indication. For example, the CN 150 may provide a visual indication when the MR is within a certain proximity of the CN 150. The visual indication may be, for example, a flashing icon that may be displayed on a display to notify a person associated with the CN 150 who may be, for example, hearing impaired.

At block 816, the MR reaches a trigger point for a particular SR associated with the path. The SR may determine that the MR has reached the trigger point by monitoring the MR's location. The SR may take action to accommodate the MR and send a notification to the MR that the SR has responded to the MR entering the trigger point. At block 818, the MR receives the notification from the SR that indicates the SR has responded to the MR entering the trigger point.

For example, suppose that an MR is associated with MRN 400a and that the MR is dispatched by CCN 130 to an incident. Further, suppose that an SR, on a path taken by the MR to the incident, is associated with SRN 500a. As the MR proceeds along the path, MRN 400a identifies a location of the MR. MRN 400a may identify the location based on information provided by GNSS RX 424. MRN 400a may process the information and include an indicator of the location of the MR in a message. The indicator may include, for example, latitude and longitude information associated with the location of the MR. The MRN 400a may send the message via network 120 to SRN 500a and CCN 130. CCN 130 may receive the message and process it. Processing may include updating GUI 310 to show the location of the MR indicated in the message.

SRN 500a may also receive the message and process it. The SRN's processing may include determining where the MR is along the path to the incident and whether the MR has reached a trigger point for the SR based where the MR's location on the path. If it is determined that the MR has reached the trigger point, the SRN 500a may enter a mode of operation to accommodate the MR. The SRN 500a may generate a message that indicates the SR has determined the MR has reached the trigger point and send the message to the MR via network 120. MRN 400a may receive the message and process it. Processing may include indicating in GUI 440 that the SR has responded to the MR entering the trigger point. Note that SRN 500a may also send a copy of the message to the CCN 130 and the CCN 130 may indicate in GUI 310 that the SRN 500a has responded to the MR reaching the trigger point.

While en route to an incident, an MR may encounter various constraints (e.g., traffic congestion). Further, these constraints may not be controllable, for example, by an SR. Here, the MRN 400 associated with the MR may communicate with a CN 150 to manage the constraint.

For example, suppose the constraint involves a vehicle that is in a path taken by an MR. Further, suppose the vehicle contains a CN 150 that is capable of communicating with an MRN 400 associated with the MR. As the MR approaches the vehicle the MRN 400 may generate and send a message to CN 150 to clear the path (e.g., move over to the side of the road, turn off to a road not on the path). The CN 150 associated with the vehicle may receive the message and display an indication that the vehicle should take action to accommodate the MR. Further the CN 150 may send a message to the MRN 400 that indicates it has received the notification and/or taken action to accommodate the MR. Status of the vehicle may be displayed in GUI 440.

Note that other ways for determining whether the vehicle has taken action to accommodate the MR may be used. For example, the CN 150 may send location information (latitude/longitude) of the vehicle and the MRN 400 may use this information to determine whether the vehicle has accommodated the MR. A result of the determination may be displayed in GUI 440 and/or logged at a CCN 130 (e.g., in data storage 338).

Figure 9A:
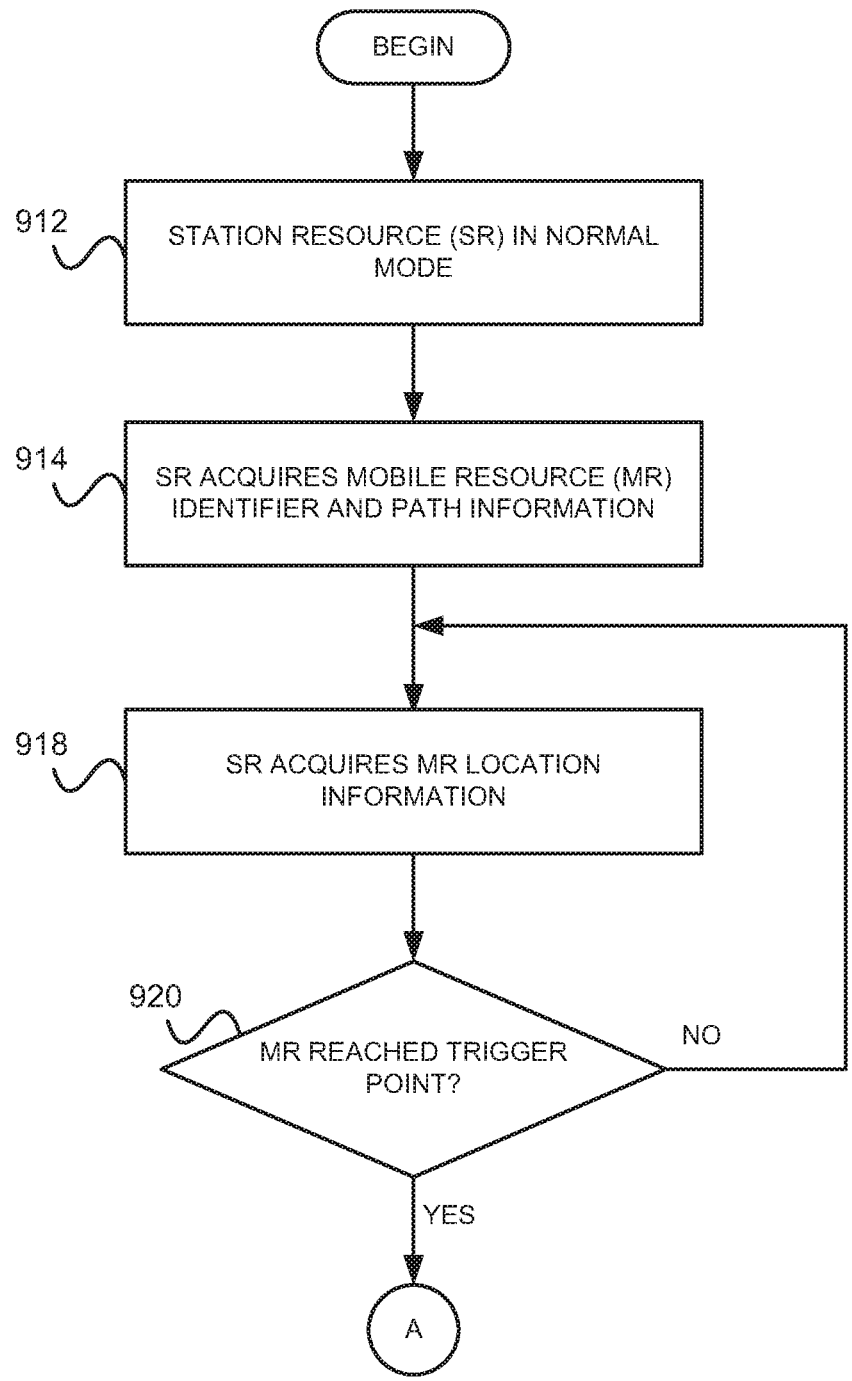
FIGS. 9A-B illustrate a flow diagram of example acts that may be performed by an SRN.
Figure 9B:
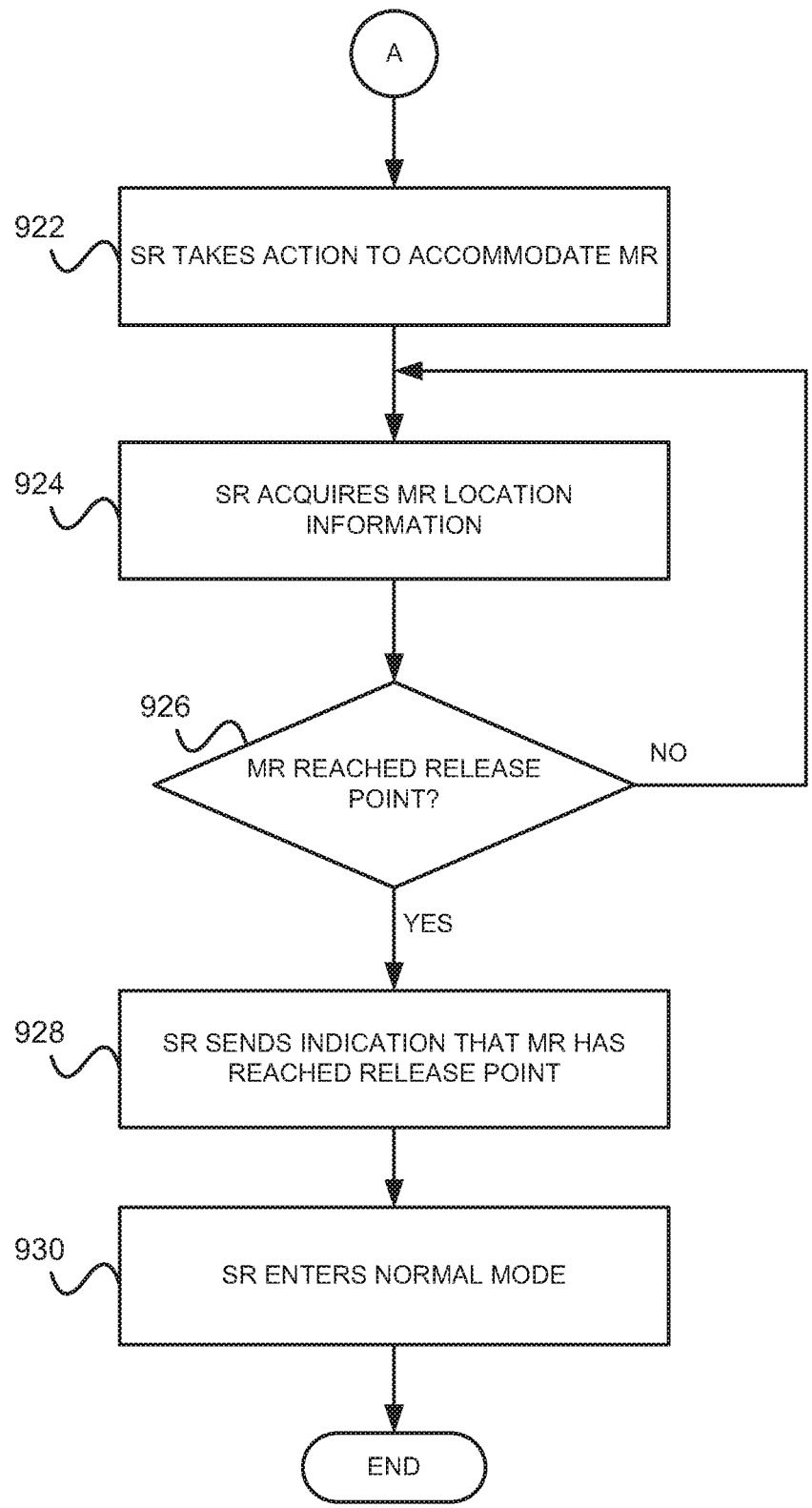

FIGS. 9A-B illustrate a flow diagram of example acts that may be performed by an SRN 500. Referring to FIG. 9A, at block 912 an SR associated with the SRN 500 may be in normal mode. Normal mode may include, for example, an operational mode the SR operates in provided it has not been assigned to an incident. For example, the SR may be an intersection that is controlled using a traffic light. When the SR has not been assigned to an incident, the traffic light may operate in a mode where the light may change from green to red and back to green in 1 minute cycles to control the flow of traffic through the intersection. This may be considered a normal mode of operation for the SR. After the SR has been assigned to an incident, the traffic light may operate differently.

At block 914, the SR may acquire (1) one or more identifiers for one or more MRs that are responding to an incident and (2) path information for those MRs. For a particular MR, an identifier may be an address (e.g., an IP address) associated with an MRN 400 for the MR. The identifiers and path information for the MRs may be acquired by an SRN 500 associated with the SR via a network, such as network 120.

At block 918, the SR acquires location information of an MR. The location information may be contained in a message that may be acquired by the SRN 500 via network 120, such as described above. At block 920, a check is performed to determine whether the MR has reached a trigger point associated with the SR. If not, the flow returns to block 918.

If the MR has reached the trigger point, at block 922 (FIG. 9B) the SR takes action to accommodate the MR. For example, as noted above, if the SR is an intersection that contains a traffic light, the SR may use the traffic light to clear traffic through the intersection. At block 924, the SR acquires location information of the MR. The location information may be acquired via an SRN 500 associated with the SR, such as described above. At block 926, a check is performed to determine whether the MR has reached a release point. A release point may be a location on the path where the SR may be released from accommodating the MR.

At block 928, the SR sends an indication that the MR has reached the release point. The indication may be sent in a message via the SRN 500 associated with the SR, such as described above. The message may be sent to a CCN 130 that dispatched the MR and/or the MRN 400 associated with the MR. After the MR reaches the release point, the SR may enter a normal mode of operation (block 930) or accommodate another MR if there are additional MRs to be accommodated by the SR. A normal mode of operation may include a mode of operation where the SR is not assigned to an incident.

For example, suppose that CCN 130 dispatches an MR associated with MRN 400a to an incident. Further, suppose that an SR, associated with SRN 500a, is assigned to the incident and is on a path taken by MRN 400a. CCN 130 may notify SRN 500a, via network 120, that the SR is assigned to the incident. The CCN 130 may also send information about a path taken by the MR and an identifier of the MR to SRN 500a.

The SR may leave a normal mode of operation and enter a standby mode of operation. In standby mode, the SRN 500a may listen for messages from MRN 400a using the identifier. The information may include location information of the MR. Based on the location information, the SRN 500a may determine that the MR has reached a trigger point. After the SRN 500a has determined that the MR has reached the trigger point, the SRN 500a may take action to accommodate the MR, such as described above.

The MRN 400a may continue to send location information of the MR via the network 120 and the SRN 500a may acquire this location information by receiving it from the network 120. Based on the received location information, the SRN 500a may determine that the MR has reached a release point. After making this determination, the SRN 500a may generate a message indicating that the MR has reached the release point. The SRN 500a may send the message to the MRN 400a and the CCN 130. In addition, SRN 500a may place the SR in a normal mode of operation. The MRN 400a and the CCN 130 may receive the message and provide indications on output device 436 and GUI 310, respectively.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 6A-D, 7A-B, 8, and 9A-B, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as processing logic 220, 416, and 516. The computer-executable instructions may be stored on one or more tangible computer-readable storage media. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. An incident resource management system, comprising:
   at least one mobile nodal subsystem, each of the at least one mobile nodal subsystem being associated with a mobile resource (MR);
   a plurality of distributive nodal subsystems, each distributive nodal subsystem being located such that it selectively controls flow of traffic through a specific portion of a roadway;
   a communications network communicatively linking each of the at least one mobile subsystem and the plurality of distributive nodal subsystems to allow communications therebetween;
   wherein the at least one mobile subsystem and the plurality of distributive nodal subsystems each includes a computing device comprising at least a memory, a processor and processing logic for execution in the processor;
   wherein the processing logic is configured and arranged for acquiring information regarding an incident, the information including a type of the incident and a location of the incident, for identifying a given MR based on the type of the incident and an operational capability associated with the given MR to respond to the incident, for determining a selected path to the incident based on a location of the given MR and the location of the incident, and for sending messages via the communications network to the given MR to be assigned to the incident, and to designate respective distributive nodal subsystems which are associated with the selected path;
   wherein the processing logic of each of the at least one mobile subsystem is configured and arranged for generating updated path information for a dispatched given MR, and sending the updated path information to at least the designated respective distributive nodal subsystems which are associated with the selected path via the communications network; and
   wherein the processing logic of the distributive nodal subsystem is configured and arranged for receiving updated path information from the at least one mobile nodal subsystem for determining a position of the given MR with respect to a given distributive nodal subsystem of the respective selected path and determining if the determined position corresponds to a trigger point for the given distributive nodal subsystem, and taking action to control the flow of traffic through the specific portion of a roadway.

2. The incident resource management system of claim 1, wherein the processing logic in the processor in each of the at least one mobile nodal subsystem includes receiving a message via the communications network from the first nodal subsystem of the assignment of the given MR to respond to the incident and for sending a message to the first nodal subsystem indicating that the given MR accepts an assignment to the incident.

3. The incident resource management system of claim 1, wherein the processing logic in the processor of mobile nodal subsystem for the given MR further includes generating updated path information for the given MR, and sending the updated path information each of the plurality of distributive nodal subsystems via the communications network.

4. The incident resource management system of claim 1, wherein the system further comprises one or more constraint nodes that provide constraint information relative to the selected path, where the constraint nodes are selected from the group consisting of cell phones, fixed sensors, mobile sensors, portable computing devices, tracking devices, and/or location reporting devices, the constraint node being communicatively coupled to each of the at least one mobile subsystem and the plurality of distributive nodal subsystems to allow communications therebetween.

5. The incident resource management system of claim 1 wherein the plurality of distributive nodal subsystems further includes one or more distributive nodal subsystems at locations along the path to be taken by the give MR and one or more distributive nodal subsystems that are associated with a respective distributive nodal subsystem at locations along the path, where the associated one or more distributive nodal subsystems are such that they selectively influence traffic flow on the path.

6. The incident resource management system of claim 5, wherein the processing logic in the processor of the respective distributive nodal subsystem at a particular path location further includes providing a control signal to a feature at the particular path location to one of control or influence flow of traffic at the particular location.

7. The incident resource management system of claim 5, wherein the processing logic in the processor of the respective distributive nodal subsystem at a particular path location further includes providing a control signal to the associated one or more distributive nodal subsystems so the associated distributive nodal subsystem one of controls or influences flow of traffic at the particular location.

8. The incident resource management system of claim 5, wherein the respective distributive nodal subsystem at a particular path location and the associated one or more distributive nodal subsystems form a cluster of distributive nodal subsystems.

9. The incident resource management system of claim 5 wherein:
the processing logic in the processor of the at least one mobile nodal subsystem of the given MR includes determining a location of the given MR in a time sequence and communicating such location information to the plurality of distributive nodal subsystems via the communications network; and
the processing logic in the processor of the plurality of distributive nodal subsystems includes determining from the communicated location information from the given MR whether the given MR is located at a trigger point with respect to a respective distributive nodal subsystem and if it is determined that the given MR has reached the trigger point then the processing logic further include establishing a particular operating condition for the respective distributive nodal subsystem.

10. The incident resource management system of claim 1, wherein the particular operating condition is a standby condition.

11. The incident resource management system of claim 5, wherein the processing logic in the processor of the respective distributive nodal subsystem further includes taking action to accommodate the given MR based on the given MR reaching the trigger point.

12. The incident resource management system of claim 1, wherein the processing logic in the processor of the respective distributive nodal subsystem includes determining based on additional location information of the given MR if the given MR has reached a release point; and
if it is determined that the given MR has reached the release point then the processing logic in the processor of the respective distributive nodal subsystem further includes releasing the respective distributive nodal subsystem from functions associated with incident response.

13. The incident resource management system of claim 1, further comprising a first nodal subsystem; and
wherein the communications network communicatively linking each of the first nodal subsystem, the at least one mobile subsystem and the plurality of distributive nodal subsystems to allow communications therebetween;
wherein the first nodal subsystem, the at least one mobile subsystem and the plurality of distributive nodal subsystems each includes a computing device comprising at least a memory, a processor and processing logic for execution in the processor;
wherein the processing logic for the first nodal subsystem is configured and arranged for acquiring information regarding an incident, the information including a type of the incident and a location of the incident, for identifying a given MR based on the type of the incident and an operational capability associated with the given MR to respond to the incident, for determining a selected path to the incident based on a location of the given MR and the location of the incident, for sending messages via the communications network to the given MR to be assigned to the incident, and to designate respective distributive nodal subsystems which are associated with the selected path.

14. The incident resource management system of claim 13, wherein the processing logic for the first nodal subsystem is configured and arranged:
(a) for acquiring information regarding an incident, the information including a type of the incident and a location of the incident,
(b) for identifying a first MR based on the type of the incident and the operational capability associated with the first MR,
(c) for identifying a second MR based on the type of the incident and an operational capability associated with the second MR, wherein the first and second MR are selected from the group consisting of police personnel, taxi personnel, tow trucks personnel, ambulance personnel, aircraft personnel, military equipment personnel and other emergency personnel, (d) for identifying a first generic path scenario to the incident based on a location of the first MR and the location of the incident, (e) for identifying a second generic path scenario to the incident based on a location of the second MR and the location of the incident, (f) for determining which of the first MR and the second MR should be dispatched as the given MR to respond to the incident based on the respective first and second generic path scenarios, and (g) for sending messages via the communications network to the MR to be dispatched indicating that the selected MR is assigned to the incident, and to designate respective distributive nodal subsystems which are associated with the respective determined generic path scenario.

15. The incident resource management system of claim 14, wherein the processing logic in the processor of the first nodal subsystem includes acquiring such constraint information from the one or more constraint nodes in determining the selected path to be taken by the given MR to the incident location.

16. A method for managing resources responding to an incident said method comprising the steps of:

providing a resource management system comprising a first nodal subsystem, at least one mobile nodal subsystem, each of the at least one mobile nodal subsystem being associated with a mobile resource (MR), a plurality of distributive nodal subsystems, each distributive nodal subsystem being located such that it selectively controls flow of traffic through a specific portion of a roadway, a communications network communicatively linking each of the first nodal subsystem, the at least one mobile subsystem and the plurality of distributive nodal subsystems to allow communications therebetween and wherein each of the first nodal subsystem, the at least one mobile subsystem and the plurality of distributive nodal subsystems including a computing device comprising at least a memory, a processor and processing logic for execution in the processor;

by the processing logic of each of the at least one mobile subsystem generating updated path information for the dispatched MR, and sending the updated path information to at least the designated respective distributive nodal subsystems which are associated with the selected path via the communications network; and by the processing logic of the distributive nodal subsystem for receiving updated path information from the at least one mobile nodal subsystem for determining a position of a dispatched given MR with respect to a given distributive nodal subsystem of the respective selected path and determining if the determined position corresponds to a trigger point for the given distributive nodal subsystem, and taking action to control the flow of traffic through the specific portion of a roadway.

17. The method of claim 16, further comprising by the processing logic in the processor of the first nodal subsystem acquiring constraint information from the one or more constraint nodes in determining the path to be taken by the given MR to the incident location and by the processing logic in the processor for the first nodal subsystem (I) acquiring information regarding an incident, the information including a type of the incident and a location of the incident, (II) identifying a given MR based on the type of the incident and an operational capability associated with the given MR to respond to the incident, (III) determining a selected path to the incident based on a location of the given MR and the location of the incident, (IV) sending messages via the communications network to the given MR to be assigned to the incident, and to designate respective distributive nodal subsystems which are associated with the selected path.

18. The method of claim 16, wherein the provided plurality of distributive nodal subsystems further includes providing one or more distributive nodal subsystems at locations along the path to be taken by the give MR and providing one or more distributive nodal subsystems that are associated with a respective distributive nodal subsystem at locations along the path, where the associated one or more distributive nodal subsystems are such that they selectively influence traffic flow along the path.

19. The method of claim 16, further comprising by the processing logic in the processor of the respective distributive nodal subsystem at a particular path location providing a control signal to a feature at the particular path location so as to one of control or influence flow of traffic at the particular location.

20. The method of claim 19, further comprising by the processing logic in the processor of the respective distributive nodal subsystem at a particular path location providing a control signal to the associated one or more distributive nodal subsystems so the associated as to one of control or influence flow of traffic at the particular location by the associated one or more distributive nodal subsystems.

21. The method of claim 19, wherein the provided respective distributive nodal subsystem at a particular path location and the associated one or more distributive nodal subsystems form a cluster of distributive nodal subsystems.

* * * * *